(12) United States Patent
Fujita et al.

(10) Patent No.: US 8,457,329 B2
(45) Date of Patent: Jun. 4, 2013

(54) MIXING CONTROL APPARATUS

(75) Inventors: Hiroaki Fujita, Hamamatsu (JP);
Kotaro Terada, Hamamatsu (JP);
Masaaki Okabayashi, Hamamatsu (JP);
Takeshi Ando, Hamamatsu (JP)

(73) Assignee: Yamaha Corporation (JP)

( * ) Notice: Subject to any disclaimer, the term of this patent is extended or adjusted under 35 U.S.C. 154(b) by 418 days.

(21) Appl. No.: 12/726,400

(22) Filed: Mar. 18, 2010

(65) Prior Publication Data

US 2010/0239107 A1   Sep. 23, 2010

(30) Foreign Application Priority Data

Mar. 20, 2009 (JP) .................................. 2009-69167
Mar. 20, 2009 (JP) .................................. 2009-69168
Mar. 20, 2009 (JP) .................................. 2009-69169
Mar. 20, 2009 (JP) .................................. 2009-69170

(51) Int. Cl.
*H04B 1/00* (2006.01)

(52) U.S. Cl.
USPC ......................................................... 381/119

(58) Field of Classification Search
USPC .................................. 381/119, 109; 369/3–4
See application file for complete search history.

(56) References Cited

U.S. PATENT DOCUMENTS 5,257,317 A * 10/1993 Stavrou ......................... 381/119
8,161,390 B2 * 4/2012 Takeda et al. ................. 715/735
8,178,771 B2 * 5/2012 Ando ............................... 84/644
2003/0059066 A1 * 3/2003 Kohyama et al. ............. 381/119
2007/0067055 A1 * 3/2007 Terada ............................ 700/94

FOREIGN PATENT DOCUMENTS

| EP | 1715606 A1 | 10/2006 |
| JP | 7-193889 A | 7/1995 |

OTHER PUBLICATIONS

Digital Production Console DM 2000 Owner's Manual published by YAMAHA Corporation Pro Audio & Digital Musical Instrument Division in Feb. 2002. Cited in spec.
"Congo jr Master Playback Wind", Oct. 1, 2006, pp. 1-2, XP055055603.
Extended European Search Report issued in European counterpart application No. EP10156475.5, dated Mar. 15, 2013.

* cited by examiner

*Primary Examiner* — Disler Paul
(74) *Attorney, Agent, or Firm* — Rossi, Kimms & McDowell LLP

(57) ABSTRACT

A sub-console 1200 has a lower channel strip group 40 on a front panel 1202, and an upper channel strip group 42 on a rear panel 1206. Left and right displays 52 and 54 are provided between the upper and lower channel strip groups 42 and 40. Either one of the parameter of the upper and lower channel strip groups 42 and 40 is displayed on the left and right displays 52 and 54. With this structure, the width of the sub-console 1200 can be reduced, and the positional correspondence relationship between the respective channel strip groups and the left and right displays 52 and 54 can be maintained. Accordingly, a high operability can be realized.

3 Claims, 20 Drawing Sheets

Channel strip 70-1

Right end of middle panel 1204 on sub-console

Lower layer selecting section 44

When front panel 1202 is selected (lower side)

When rear panel 1206 is selected (upper side)

SEND part – 1
(Level display)

SEND part – 2
(Balance display)

SEND part – 3
(Meter display)

VIEW part

MENU screen

Signal processing parameter

Image-data template

Display control data(Non-volatile area)

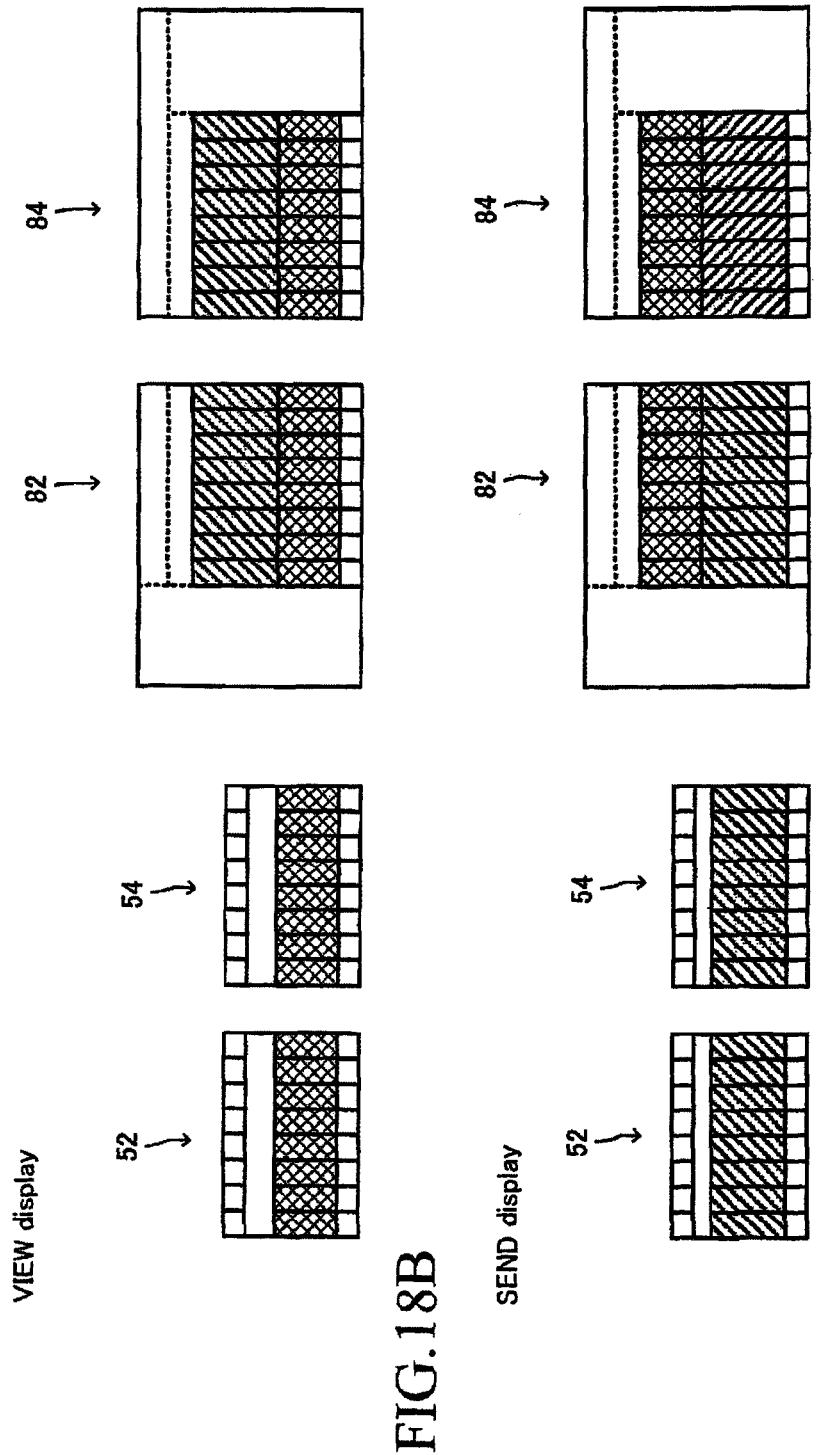
FIG.18A VIEW display
FIG.18B SEND display

When front panel 1202 is selected

When rear panel 1206 is selected

MIXING CONTROL APPARATUS

BACKGROUND OF THE INVENTION

1. Field of the Invention

The present invention relates to a mixing control apparatus that is well adaptable for adjusting a sound signal in a concert.

2. Description of the Related Arts

On an operation panel of a mixer used in a concert, a section collectively including a fader, a knob, a switch, and other components for adjusting a sound signal of a certain one channel is referred to as a "channel strip". JP-A-7-193389 discloses a technique in which displays (touch panels), each corresponding to each channel strip, are arranged at the rear side in order to display and set parameters involved with the respective channels. A configuration of a general mixer is described in, for example, "DM2000 Manual" published by Yamaha Corporation on February, 2002.

A mixer used in a concert is mostly arranged on audience seats of a concert hall. When the size of the mixer is increased, the number of the audience seats is decreased. Therefore, a demand for downsizing the mixer has been increased. The mixer disclosed in JP-A-7-193389 has a problem that, when the number of the channel strips is increased, the width of the mixer is increased to occupy the increased number of audience seats. Since the width of the mixer is increased, it is inconvenient to carry or install the mixer, and further, a user has to move in the lateral direction during the operation of the mixer. The mixer disclosed in JP-A-7-193389 has a problem that, when the number of the channel strips is increased, the number of the displays (or area) is increased with the increase in the channel strips, which raises a cost for the mixer. When the display is downsized, the positional correspondence relationship between the channel strips and the displays cannot be secured, which causes a troublesome operation.

SUMMARY OF THE INVENTION

The present invention is accomplished in view of the above-mentioned problem, and aims to provide a mixing control apparatus that can be downsized and has an excellent operability.

In order to solve the above-mentioned problem, the mixing control apparatus includes the components described below. It is to be noted that the numerals in parenthesis are only illustrative.

One aspect of the present invention is a mixing control apparatus (1200) that gives an instruction of a parameter value of each sound signal in order to perform a signal process to a sound signal of a first channel group (input first layer) including plural channels and a sound signal of a second channel group (input second layer) including plural channels, the mixing control apparatus including a first channel strip group (40) composed of plural channel strips, each having a first operation device (2) for giving an instruction of a parameter value (sound volume) of the sound signal belonging to the first channel group; a second channel strip group (42) that is provided at the rear of the first channel strip group (40) and above the first channel strip group (40) when the mixing control apparatus is viewed from the front, and that is composed of plural channel strips, each having a second operation device (2) for giving an instruction of a parameter value (sound volume) of the sound signal belonging to the second channel group; and a display section (52, 54) that is provided between the first channel strip group (40) and the second channel strip group (42), and that displays the parameter value involved with the designated one of the first channel group and the second channel group or display the parameter values involved with both of the first and the second channel groups.

In the mixing control apparatus described above, the first operation device (2) is for giving an instruction of the parameter value (sound volume) of a predetermined type of the sound signal belonging to the first channel group, while the second operation device (2) is for giving an instruction of the parameter value (sound volume) of the predetermined type of the sound signal belonging to the second channel group.

The mixing control apparatus described above may further include a changeover instruction detecting section (SEL button 10) that detects the instruction of the changeover as to which parameter is displayed, the parameter of the first channel group or the parameter of the second channel group, on the display section (52, 54).

In the mixing control apparatus described above, the channel strips belonging to the first channel strip group (40) are arranged along the lateral direction of the mixing control apparatus viewed from the front and each of them has a same predetermined width, the channel strips belonging to the second channel strip group (42) are arranged along the lateral direction of the mixing control apparatus viewed from the front and each of them has a same predetermined width equal to the width of each channel strip belonging to the first channel strip group, the display screen of the display section (52, 54) is divided into plural frames, each being arranged along the lateral direction of the mixing control apparatus viewed from the front, and each having a same predetermined width equal to the width of each channel strip belonging to the first and second channel strip group, and nth ($1 \leq n \leq$ number of channels in the first channel strip group) channel strip from the left belonging to the first channel strip group (40), the nth channel strip from the left belonging to the second channel strip group (42), and the nth frame from the left of the display section (52, 54) are arranged on the same position in the lateral direction of the mixing control apparatus viewed from the front.

In the mixing control apparatus described above, when a tilt angle made by the installation surface of the mixing control apparatus and the first channel strip group (40) is defined as $\theta 1$, a tilt angle made by the installation surface and the display section (52, 54) is defined as $\theta 2$, and a tilt angle made by the installation surface and the second channel strip group (42) is defined as $\theta 3$, the tilt angles have a relationship of "$\theta 1 < \theta 3 < \theta 2$".

According to one aspect of the present invention, the second channel strip group is provided at the rear of the first channel strip group and above the first channel strip group, and the display section is formed between the first channel strip group and the second channel strip group, whereby the mixing control apparatus can be downsized, and the positional relationship between the first and the second channel strip groups and the display section can be secured. Accordingly, a high operability can be realized.

Another aspect of the present invention is a mixing control apparatus, which controls the signal process involved with the mixing, in a mixing apparatus for mixing sound signals of plural channels, the mixing control apparatus including a first channel strip group (40) that includes plural channel strips to which any one of the sound signals of the plural channels is assigned, and which set a parameter for the signal process of the assigned sound signal; a second channel strip group (42) that includes plural channel strips to which any one of the sound signals of the plural channels is assigned, and which set a parameter for the signal process of the assigned sound signal; a parameter display section (52b, 54b) that is provided between the first and the second channel strip groups (40, 42) and that displays the parameter of the plural channels involved only with either one of the first and second channel strip groups (40, 42); a display side designation detecting section (SP22) that detects the display side designation as to the information involved with which one of the first and the second channel strip groups (40, 42) is displayed; and a display control section (SP40 to SP44) that displays the information of the plural channels involved with the channel strip group at the side designated by the display side designation in the manner associated with the designated side.

In the mixing control apparatus, the display control section (SP40 to SP44) displays the information of the plural channels involved with the first channel strip group (40) at a predetermined first position in the display screen of the parameter display section (52b, 54b), when the first channel strip group (40) is designated by the display side designation, and displays the information of the plural channels involved with the second channel strip group (42) at a predetermined second position, which is closer to the second channel strip group (42) than the first predetermined position, when the second channel strip group (42) is designated by the display side designation.

According to another aspect of the present invention, the parameter display section is provided between the first and the second channel strip groups. Therefore, the mixing control apparatus can be downsized, and the information involved with the channel strip group at the side designated by the display side designation is displayed in the manner associated with the designated side. Accordingly, a user can easily recognize that the information currently displayed is involved with which one of the first and the second channel strip groups. Consequently, a high operability can be realized.

Still another aspect of the present invention is a mixing control apparatus that is used in cooperation with a main console (1100) including a channel strip group (70) composed of plural channel strips, which designate parameter values of a sound signal of a channel group including plural channels, and a main display (82, 84) that simultaneously displays a first part image (VIEW part image) displaying a first type of parameter for the channel group and a second part image (SEND part image) displaying a second type of parameter for the channel group as arranging along a predetermined direction (front-to-rear direction), the mixing control apparatus constituting a sub-console (1200), which controls a signal process involved with the mixing for mixing the sound signal of the plural channels with the main console (1100), the mixing control apparatus comprising: a first channel strip group (40) including plural channel strips that gives an instruction of the parameter values of the sound signal of a first channel group (input first layer) composed of plural channels; a second channel strip group (42) including plural channel strips that gives an instruction of the parameter values of the sound signal of a second channel group (input second layer) composed of plural channels; a sub-display (52, 54) that selects and displays only one of the first part image (VIEW part image) and the second part image (SEND part image) as a display part image for one of the first and the second channel groups; and a part selecting section (66, 68) that selects only one of the first part image and the second part image as the display part image on the sub-display (52, 54).

According to still another aspect of the present invention, the sub-display is shared by the first and second channel strip groups on the sub-console, and the sub-display selects and displays either one of the first and the second part images displayed on the main display. Accordingly, the sub-display can be downsized.

Still another aspect of the present invention is a mixing control apparatus, which controls the signal process involved with the mixing, in a mixing apparatus for mixing sound signals of plural channels, the mixing control apparatus including a first channel strip group (40) that is composed of plural channel strips to which any one of the sound signals of the plural channels is assigned, each channel strip having a selecting button (10) for designating the assigned sound signal as one channel that is exclusively selected so as to adjust a predetermined parameter of the sound signal of the plural channels; a second channel strip group (42) that is composed of plural channel strips to which any one of the sound signals of the plural channels is assigned, each channel strip having a selecting button (10) for designating the assigned sound signal as one channel that is exclusively selected so as to adjust a predetermined parameter of the sound signal of the plural channels; a parameter display section (52b, 54b) that is provided between the first and the second channel strip groups (40, 42), and that displays the parameter specifying the content of the signal process for only one of the first and the second channel strip groups (40, 42), and a display side selecting section (SP22, SP40) that, when the selecting button (10) belonging to either one of the first and the second channel strip groups (40, 42) is operated, allows the parameter display section (52b, 54b) to display the parameters of the plural channels involved only with the channel strip group to which the operated selecting button (10) belongs.

In the mixing control apparatus, the display side selecting section (SP22, SP40) includes a determining section (SP22) that, when the selecting button (10) belonging to either one of the first and the second channel strip groups (40, 42) is operated, determines whether the channel strip group whose parameter is currently displayed on the parameter display section (52b, 54b) and the channel strip group to which the operated selecting button (10) belongs are equal to each other or not; and a display control section (SP42, SP44) that maintains the display content on the parameter display section (52b, 54b) when the result of the determination by the determining section (SP22) is positive, and that changes the display content on the parameter display section (52b, 54b) so as to display the parameter involved with the channel strip group to which the operated selecting button (10) belongs, when the result of the determination by the determining section (SP22) is negative.

According to still another aspect of the present invention, the display section is provided between the first and the second channel strip groups, whereby the mixing control apparatus can be downsized. When the selecting button is operated, the channel group involved with the channel strip group to which the selecting button belongs is selected as the channel group displaying the parameter value on the display section. Therefore, the parameter involved with the channel that makes a detailed setting of the parameter can automatically be displayed, whereby a high operability can be realized.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 18A is a view for illustrating an operation of a process for aligning the display of the VIEW part image;

FIG. 18B is a view for illustrating an operation of a process for aligning the display of the SEND part image;

DETAILED DESCRIPTION OF THE PREFERRED EMBODIMENTS

1. Configuration of Hardware in Embodiment

Figure 1:
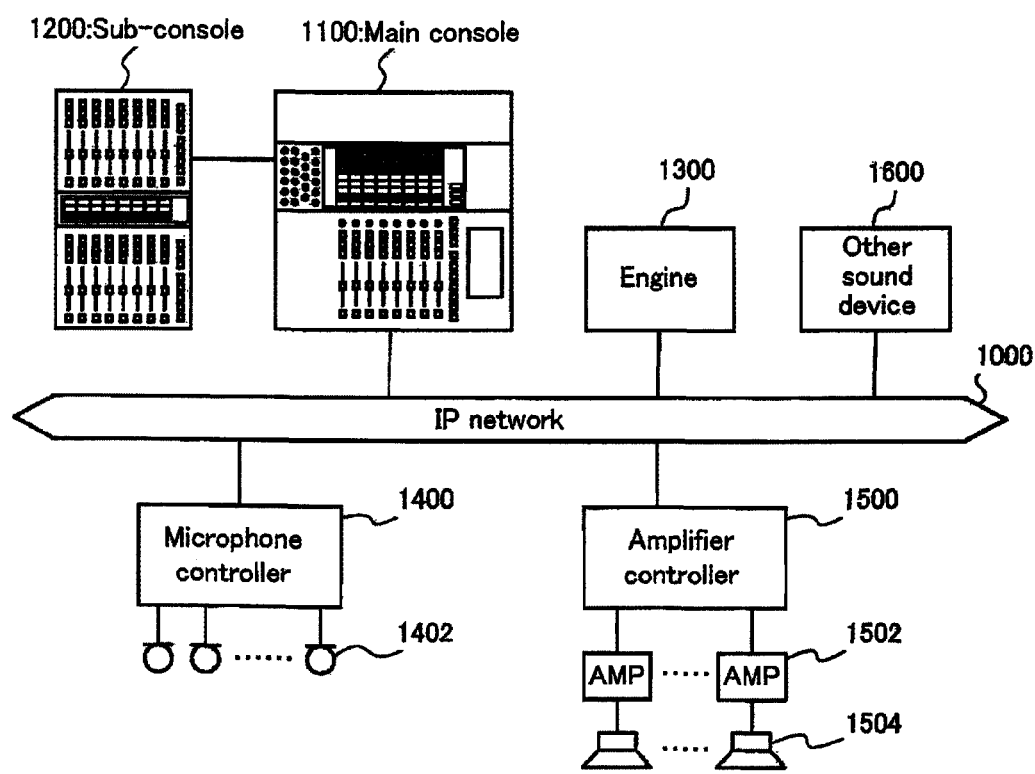
FIG. 1 is a block diagram of an acoustic system according to one embodiment of the present invention.

A configuration of an acoustic system according to one embodiment of the present invention will be described below with reference to FIG. 1. The acoustic system includes an IP network 1000, an engine 1300, a microphone controller 1400, and an amplifier controller 1500.

The IP network 1000 transmits a digital sound signal and various control signals as an IP packet. The engine 1300 receives the sound signals of the plural channels through the IP network 1000, and performs a process, including equalizing, mixing, effect, and the like, to the sound signals. Then, the engine 1300 convert the sound signals of the plural channels, which are obtained through the process described above, into an IP packet, and outputs the resultant through the IP network 1000. The microphone controller 1400 converts the sound signals inputted from plural microphones 1402 into an IP packet, and outputs the resultant to the engine 1300 through the IP network 1000. The amplifier controller 1500 converts the IP packet, which is received from the engine 1300 through the IP network 1000, into a digital signal in a predetermined form, and supplies the resultant to plural amplifiers 1502.

Each of the amplifiers 1502 converts the supplied digital signal into an analog signal, amplifies the same, and emits sound through plural speakers 1504 connected to each amplifier 1502. Other sound device 1600 is composed of, for example, a hard disk recorder. The other sound device 1600 inputs and outputs the sound signal as the IP packet to and from the engine 1300 through the IP network 1000. A main console 1100 operated by a user gives an instruction of setting various parameters to the engine 1300, the microphone controller 1400, and the amplifier controller 1500. Specifically, when the instruction for setting the parameter is given through the operation of the main console 1100, this instruction is supplied to the engine 1300 as an IP packet of the control signal so as to be reflected on the parameter on the engine 1300.

A sub-console 1200 is connected to the main console 1100, if needed. Specifically, the sub-console 1200 is not connected to the IP network 1000, but directly connected to the main console 1100. The main console 1100 itself can set the parameters of all channels in the engine 1300. However, the number of the operation devices and the display devices provided on the main console 1100 is limited. Therefore, the number of the channels whose parameters can be operated simultaneously is limited. When the sub-console 1200 is added, the operability in setting the parameters can be enhanced. In the example in FIG. 1, only one sub-console 1200 is illustrated. However, a maximum of four sub-consoles 1200 can be connected to the main console 1100.

Figure 2A:
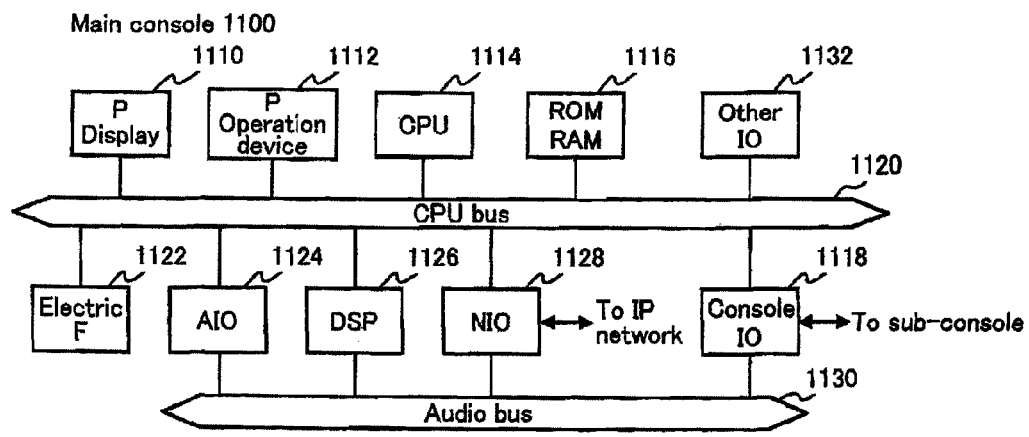
FIG. 2A is a block diagram of a main console in FIG. 1.

The detailed configuration of the main console 1100 will be described with reference to FIG. 2A. A panel display group 1110 is composed of a dot matrix display, LED, and the like provided on the operation panel. A panel operation group 1112 is composed of a button, knob, and the like provided on the operation panel. A CPU 1114 controls the other components on the basis of a program stored in a memory 1116 (ROM and RAM) through a CPU bus 1120. The RAM in the memory 1116 is provided with a non-volatile area that retains a stored content even when a power is turned off. An electric fader group 1122 is provided for adjusting a signal level of the respective input/output channels on the basis of the operation by a user. When an operation command is supplied to the electric fader group 1122 through the CPU bus 1120, the operation position thereof is automatically set.

When an analog sound signal is inputted to a sound I/O section 1124, it converts this signal into a digital sound signal, and outputs the resultant via an audio bus 1130. The sound I/O section 1124 also converts a digital sound signal, which is supplied via the audio bus 1130, into an analog signal, and outputs the resultant to the outside. A DSP (digital signal processor) 1126 performs an equalizing process to the sound signal supplied through the audio bus 1130. In the acoustic system according to the present embodiment, most of the sound signal processes are executed in the engine 1300. However, a small-scale sound signal process and input/output, including a talk-back and a monitor, is also executed in the main console 1100. The voice I/O section 1124 and the DSP 1126 are to perform the sound signal process and the input/output described above.

A network I/O section 1128 converts the control signal, which is supplied through the audio bus 1130, and the sound signal, which is supplied through the CPU bus 1120, into an IP packet, and outputs the resultant to the IP network 1000. The network I/O section 1128 also converts the IP packet received from the IP network 1000 into a control signal or the sound signal, and outputs the resultant through the CPU bus 1120 or the audio bus 1130. A console I/O section 1118 inputs and outputs the control signal and the sound signal to and from the sub-console 1200. An other I/O section 1132 inputs and outputs data from and to the other devices, e.g., a general-purpose personal computer.

Figure 2B:
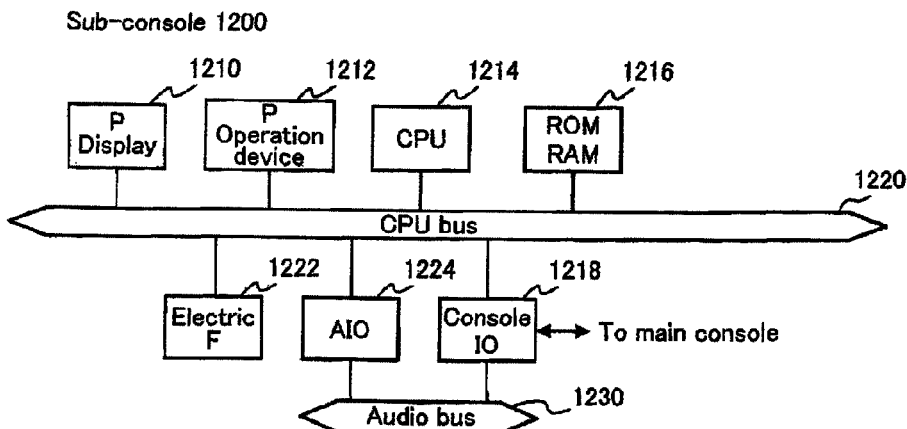
FIG. 2B is a block diagram of a sub-console in FIG. 1.

Next, a detailed configuration of the sub-console 1200 will be described with reference to FIG. 2B. A panel display device group 1210, panel operation device group 1212, CPU 1214, memory (ROM and RAM) 1216, electric fader group 1222, sound I/O section 1224, and audio bus 1230 are configured to be substantially the same as the components 1110, 1112, 1114, 1116, 1122, 1124, and 1130 of the main console 1100. A console I/O section 1218 inputs and outputs the control signal and the sound signal from and to the console I/O section 1118 of the main console 1100.

Figure 2C:
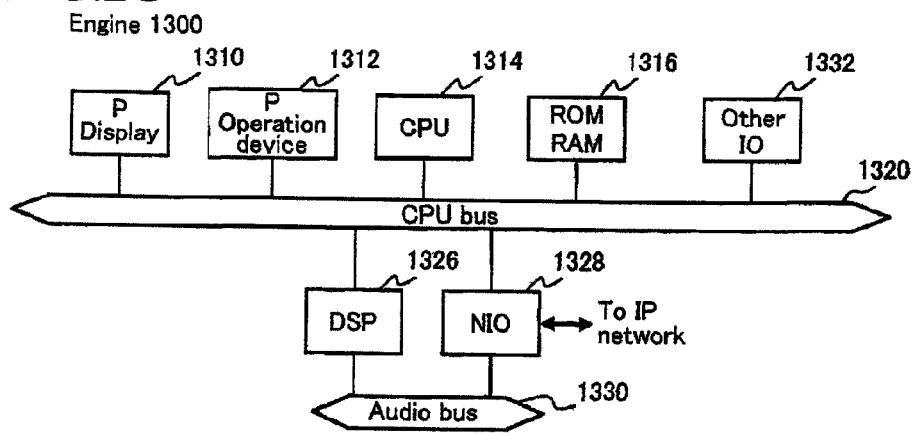
FIG. 2C is a block diagram of an engine.

Subsequently, a detailed configuration of the engine 1300 will be described with reference to FIG. 2C. A panel display device group 1310 and a panel operation device group 1312 are used to make a simple setting and display to the engine 1300. A CPU 1314, memory (ROM and RAM) 1316, DSP 1326, network I/O section 1328, audio bus 1330, and other I/O section 1332 are configured to be substantially the same as the components 1114, 1116, 1126, 1128, 1130, and 1132 of the main console 1100. It is to be noted that the DSP 1326 is configured with the scale larger than the scale of the DSP 1126, since the DSP 1326 has most of the mixing and equalizing functions in the acoustic system. The engine 1300 does not adjust the parameter values of the DSP 1326 by itself, but the respective parameter values in the DSP 1326 are adjusted on the basis of the signal process parameter received from the main console 1100.

2. Mixing Algorithm Configuration

Figure 3:
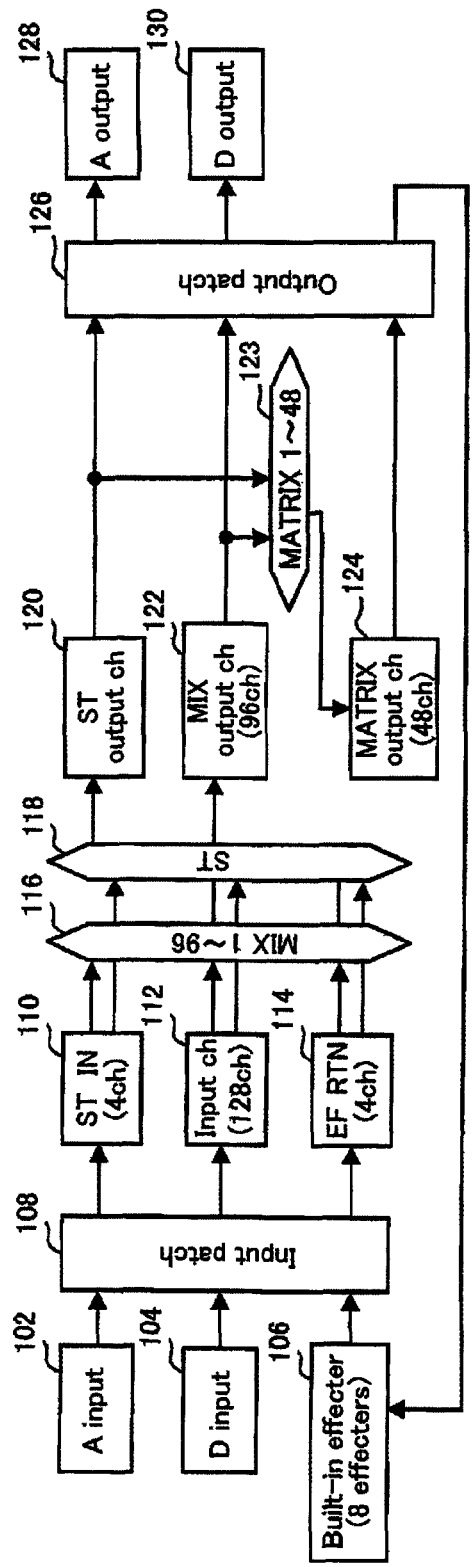
FIG. 3 is a block diagram of an algorithm realized by the engine.

Next, an algorithm realized in the engine 1300 will be described with reference to FIG. 3. The algorithm is realized by the program set to the DSP 1326. The program is loaded to the DSP 1326 from the memory 1316 or the like under the control of the CPU 1314. The various parameters (e.g., on/off state of a switch, or gain at an amplifying section) in the algorithm is set by the CPU 1314 on the basis of the control signal supplied from the main console 1100 to the network I/O section 1328 through the IP network 1000. When the parameter value is changed by the operation of the sub-console 1200, the changed parameter value is not directly transmitted to the engine 1300 from the sub-console 1200, but is always transmitted to the engine 1300 through the main control 1100.

When receiving an analog sound signal at a microphone level or a line level, an analog input section 102 converts this signal into a digital sound signal, and supplies the resultant to the engine 1300 through the IP network 1000. When receiving a digital sound signal, a digital input section 104 converts this signal into a format for the engine 1300, and supplies the resultant to the engine 1300 through the IP network 1000. The analog input section 102 and the digital input section 104 are realized by the microphone controller 1400 and the other sound device 1600 in FIG. 1. An analog output section 128 converts the sound signal, which is supplied from the engine 1300 through the IP network 1000, into an analog sound signal, and outputs the resultant to the outside. A digital output section 130 converts the digital sound signal having the internal format, which is supplied from the engine 1300 through the IP network 1000, into a digital sound signal having a predetermined format (AES/EBU, ADAT, TASCAM, etc.), and outputs the resultant. The analog output section 128 and the digital output section 130 are realized by the amplifier controller 1500 and the other voice device 1600 in FIG. 1.

The configuration described above is realized by a hardware that is different from the engine 1300. The configurations other than the configurations described above is realized by the program (including a microprogram for the DSP 1326) operated in the engine 1300. An input channel adjusting section 112 adjusts the sound volume and sound quality for the input channel of "128" channels on the basis of the operations of the electric faders, and the other operation devices on the consoles 1100 and 1200. A stereo input channel adjusting section 110 adjusts the sound volume and sound quality to the stereo input channel that is a maximum of four channels. It is supposed here that the sound signal of a stereo having "one" system is composed of the sound signals of "2" systems on right and left.

An effect return section 114 adjusts the sound volume and sound quality to the sound signal of "4" channels. The effect return section 114 is mainly assigned to the sound signal that is subject to the effect process. An input patch section 108 assigns the digital sound signals supplied from the plural input ports including the input sections 102 and 104 to the optional input channels of the stereo input channel adjusting section 110, the input channel adjusting section 112, and the effect return section 114. A built-in effecter section 106 is composed of effecters of a maximum of "8" units. The built-in effecter section 106 performs an effect process, including a reverb, delay, modulation, etc., to the supplied sound signal, and supplies the resultant to the effect return section 114 through the input patch section 108.

A MIX bus group 116 is composed of MIX buses of "96" channels. When each of the MIX buses is indicated, it is expressed by "MIX bus 116-$n$ ($1 \leq n \leq 96$)", for example. At each MIX bus, the one of the digital sound signals from each input channel, each stereo input channel, and each effect return (hereinafter referred to as "input channel" below) supplied to the MIX bus is mixed. Whether the sound signal is supplied to the MIX bus or not can be set for each MIX bus at each input channel. When the sound signal is supplied, a send-level or a fade-mode (pre-fade/post-fade) for each MIX bus can be set independently for each channel. A stereo bus 118 is composed of a stereo bus of "one" system. The configuration of the stereo bus is the same as that of the MIX bus.

A stereo output channel section 120 adjusts the level and the sound quality of the result of the mixing at the stereo bus. A MIX output channel section 122 adjusts the level and the sound quality of the result of the mixing at each MIX bus. A matrix bus group 123 is composed of matrix buses of "48" channels that further mixes the output signal from the stereo output channel section 120 and the MIX output channel section 122. A matrix output channel section 124 adjusts the level and the sound quality of the result of the mixing at the matrix bus group 123. An output patch section 126 assigns the output signals from the stereo output channel section 120, the MIX output channel section 122, and the matrix output channel section 124 to each of the output sections 128 and 130 or the optional unit in the built-in effecter section 106.

Next, the detail of the algorithm configuration at the input channel adjusting section 112, the stereo output channel section 120, and the MIX output channel section 122 will be described with reference to FIG. 4. An nth input channel adjusting section 112-$n$ adjusts the sound quality and sound volume at the nth input channel ($1 \leq n \leq 128$). An mth MIX output channel section 122-$m$ adjusts the sound quality and sound volume at the mth MIX output channel ($1 \leq n \leq 96$). In the nth input channel section 112-$n$, a sound quality adjusting section 150 executes a gate process, compressor process, and equalizer process at the nth input channel. The "gate process" means a process for automatically cutting unnecessary noise. The "compressor process" means a process for compressing or extending a dynamic range. The "equalizing process" means a process for setting a frequency characteristic of the sound signal of each channel by a parametric equalizer.

A channel delay section 152 delays the sound signal of the nth input channel, if needed. A sound volume adjusting section 154 adjusts the gain of the sound signal of the nth input channel. An on/off changeover section 156 changes the on-state and off-state of the overall of the nth input channel. A signal changeover sections 162-1 to 162-96 change the sound signal, which can be outputted from the nth input channel to the MIX buses of "96" channels, according to the fade-mode. Specifically, when the fade-mode is set to the "pre-fade", the output signal from the channel delay section 152 is selected. On the other hand, when the fade-mode is set to the "post-mode", the output signal from the on/off changeover section 156 is selected. Send-level adjusting sections 164-1 to 164-96 adjust the gain, i.e., the send-level, of the signal outputted to each MIX bus.

Send on/off changeover sections 166-1 to 166-96 set the on/off state of supplying the sound signal to each MIX bus. A stereo send on/off changeover section 158 changes whether the sound signal of the nth input channel is supplied to the stereo bus 118 or not. A PAN setting section 160 sets the balance of the sound volume at the left side and the right side when the sound signal is supplied to the stereo bus 118. Next, in the stereo output channel section 120, a sound quality adjusting section 170 performs a limiter process, compressor process and equalizer process (a process for adjusting the frequency characteristic) for the stereo output channel. Sound volume adjusting sections 172-L and 172-R adjust the output gain of the left and right of the stereo output channel. On/off changeover sections 174-L and 174-R change the on/off state of the left and the right of the stereo output channel.

Channel delay sections 176-L and 176-R delay the sound signal from the stereo output channel, if needed. In the mth MIX output channel section 122-$m$, a sound quality adjusting section 180 performs a limiter process, compressor process and equalizer process to the mth MIX output channel, like the above-mentioned sound quality adjusting section 150. A sound volume adjusting section 182 adjusts the output gain of the mth MIX output channel. On/off changeover section 184 changes the on/off state of the mth MIX output channel. A channel delay section 186 delays the sound signal from the mth MIX output channel, if needed.

3. An Outer Appearance of Console 1100 and 1200

3.1 Overall Shape

Figure 5:
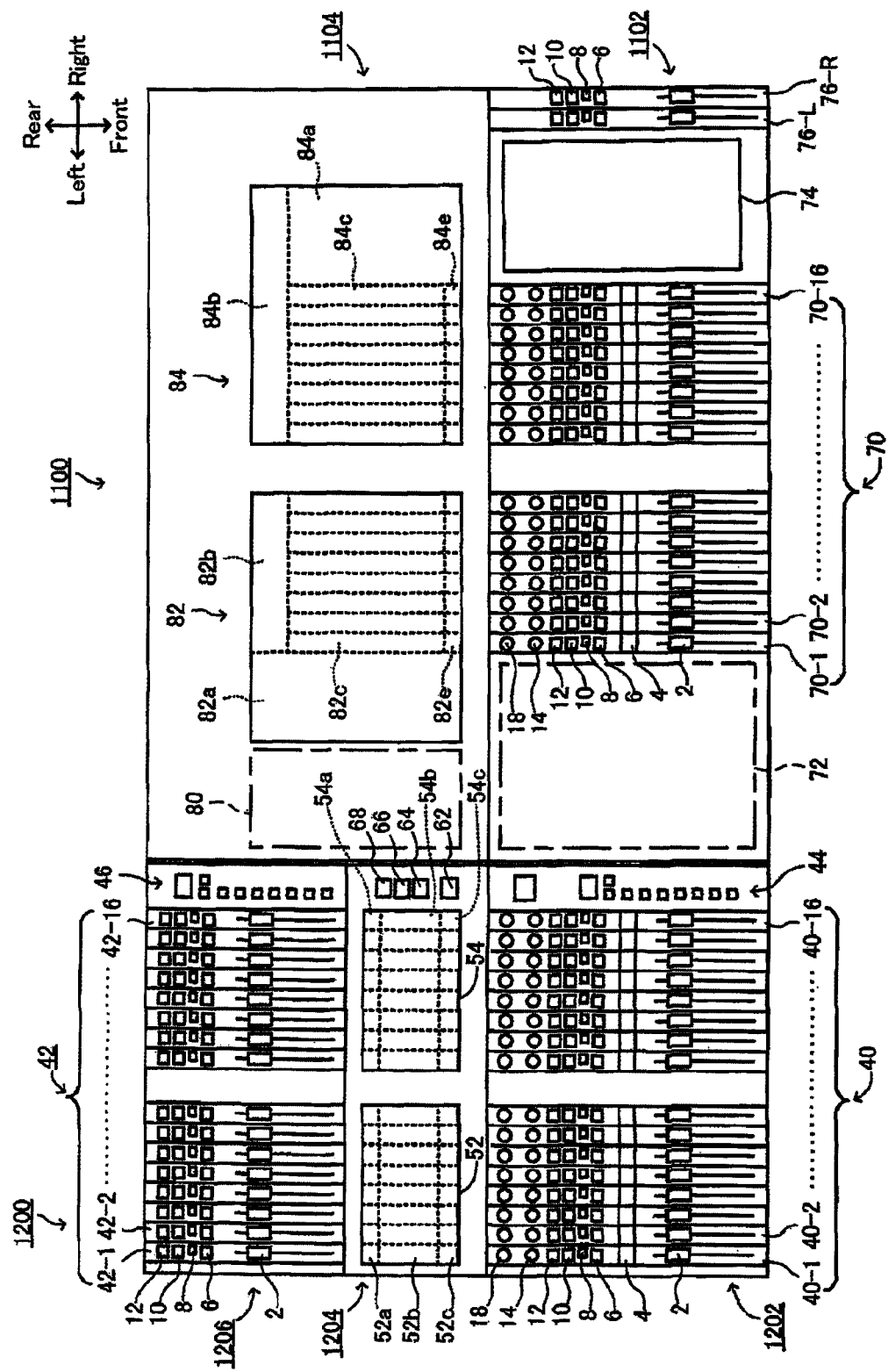
FIG. 5 is a plan view of the main console and the sub-console.

Next, FIG. 5 is a plan view of the consoles 1100 and 1200 that are arranged side by side. The operation panel (upper plate) of the main console 1100 is composed of a rectangular flat-plate front panel 1102 arranged horizontally at the front part, and a rectangular flat-plate rear panel 1104 that is arranged as tilted at the rear part in such manner that the rear end is lifted up. The sub-console 1200 includes a rectangular flat-plate front panel 1202 arranged at the front part, a rectangular flat-plate rear panel 1206 arranged at the rear part, and a rectangular flat-plate middle panel 1204 arranged between both panels. Although the detail is described below, lower and upper channel strip groups 40 and 42 are arranged on the rear panel 1206 and the front panel 1202, while left and right displays 52 and 54, which constitute a "display section" shared by the upper and lower channel strip groups 42 and 40, are provided on the middle panel 1204.

Both of the upper and lower channel strip groups 42 and 40 are arranged so as to be adjacent to the left and right displays 52 and 54 in order that, even when either one of information pieces from the upper and the lower channel strip groups 42 and 40 is displayed on the left and right displays 52 and 54, this information is easy to be confirmed. Specifically, the upper channel strip group 42 is arranged so as to face one side of the "display section", while the lower channel strip group 40 is arranged so as to face the other one side of the "display section". More specifically, the upper channel strip group 42 is arranged so as to be adjacent to the upper side of the "display section", wherein the lower side of the upper channel strip group 42 faces the upper side of the "display section". The lower channel strip group 40 is arranged so as to be adjacent to the lower side of the "display section", wherein the upper side of the lower channel strip group 40 faces the lower side of the "display section". As illustrated in FIG. 5, the consoles 1100 and 1200 are configured to have the same depth (the length in the front-to-rear direction).

Figure 6:
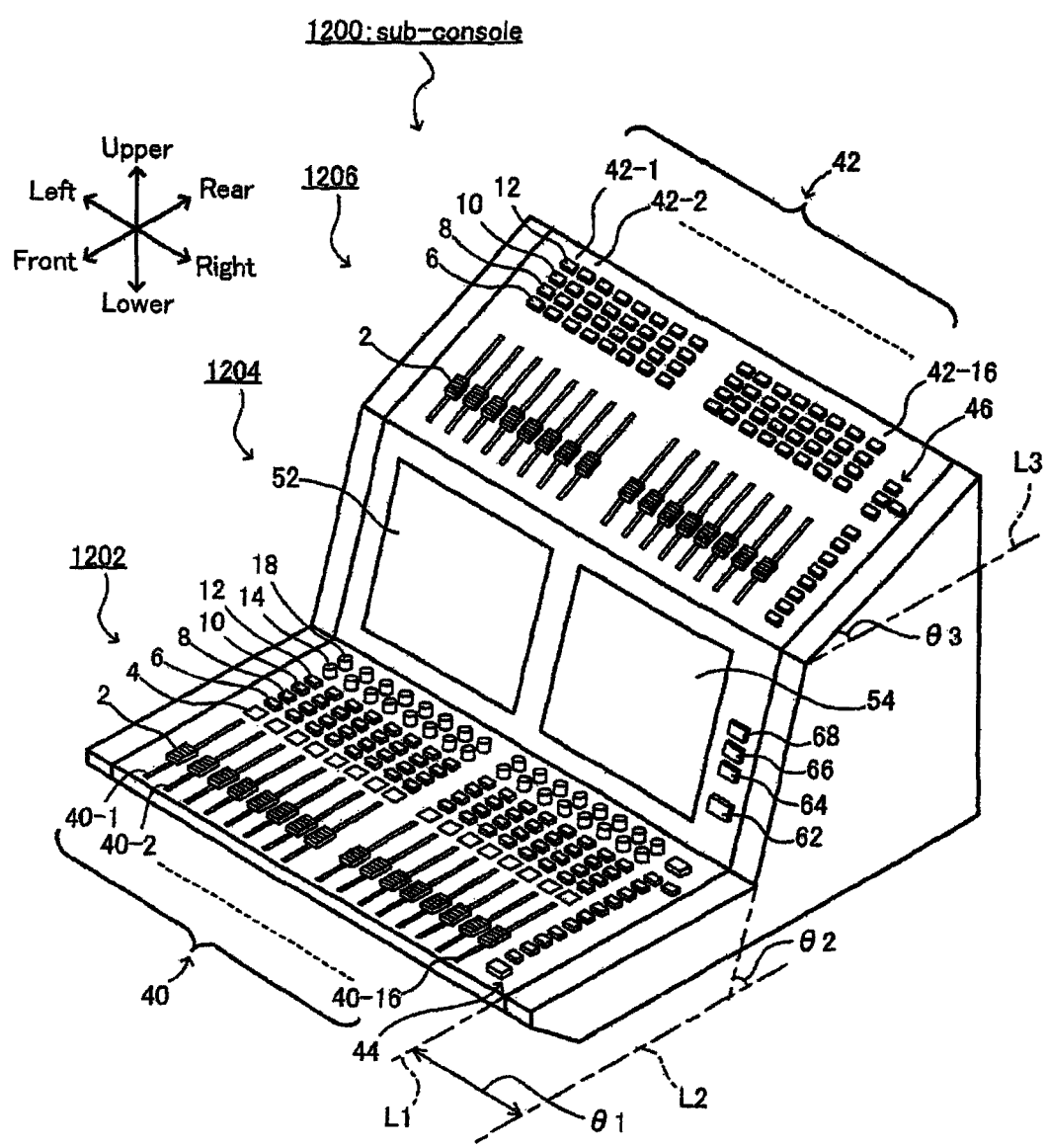
FIG. 6 is a perspective view of the sub-console.

FIG. 6 is a perspective view of the sub-console 1200. In FIG. 6, straight lines L1, L2, and L3 are lines parallel to the surface where the sub-console 1200 is installed. These lines are illustrated for reference. Since the front panel 1202 is parallel to the installation surface, the angle $\theta 1$ made by the front panel 1202 and the installation surface is "0°". The middle panel 1204 is greatly tilted toward the front panel

1202, wherein the angle θ2 is made by the middle panel 1204 and the installation surface. The rear panel 1206 is gently tilted toward the middle panel 1204, wherein the angle θ3 is made by the rear panel 1206 and the installation surface. The relationship among these angles is "θ1<θ3<θ2". Thus, the rear panel 1206 is located at the rear of the front panel 1202 and above the front panel 1202 viewed from the front.

3.2 Main Console 1100

Returning back to FIG. 5, a sound volume adjusting section 72 at the front panel 1102 of the main console 1100 is composed of various operation devices and display devices for setting in detail the parameters of the sound quality adjusting sections 150, 170, and 180, and the channel delay sections 152, 176-L, 176-R, and 186, and the like to one channel (hereinafter referred to as "selected channel") that is exclusively selected. Specifically, the sound volume adjusting section 72 includes a knob for setting the delay time at the channel delay sections 152, 176-L, 176-R, and 186, four knobs for designating "four" types of frequencies, which are a low frequency, a midrange/low frequency, a midrange/high frequency, and a high frequency, in order to perform the equalizer process (adjustment of the frequency characteristic), "four" knobs for setting gains to the "four" types of frequencies, "four" knobs for setting Q values (sharpness of peaks) for the "four" types of frequencies, a knob for setting a threshold level for performing a gate process, and a knob for setting an attenuation characteristic when the level of the sound signal becomes less than the threshold level. The configuration of the sound quality adjusting section 72 is the same as that disclosed in "DM2000 Manual" published by Yamaha Corporation on February, 2002.

Channel strips 70-1 to 70-16 are composed of operation devices for setting various parameters, such as a fader level, for "16" channels belonging to the designated "layer". These channel strips are collectively referred to as a "main channel strip group 70". The "layer" will be described here. As described above, the input channel adjusting section 112 can process the sound signals of "128" channels, the MIX output channel section 122 can process the sound signal of "96" channels, and the matrix output channel section 124 can process the sound signal of "48" channels. The "layer" means a group obtained by dividing these channels into "16" in the order of the channel number. In other words, the input channel is divided into "8" layers, the MIX output channel is divided into "6" layers, and the matrix output channel is divided into "3" layers.

Accordingly, the channel strip group 70 itself has only the operation devices and display devices corresponding to "16" channels. However, the "layer" that is to be assigned to these channels is changed, whereby the parameter of the optional channel can be set at the main channel strip group 70. In the channel strip group 70-1, an electric fader 2 adjusts the fader level (the gain of the sound quality adjusting sections 154 and 182 in FIG. 4) of the channel allocated to the channel strip 70-1 on the basis of the user's operation. When the layer is changed, the electric fader 2 is automatically driven to the position corresponding to the fader level of the newly assigned channel. The electric fader 2 is provided with a touch sensor, so that even if a user only touches the electric fader 2, the depression is detected.

A character display device 4 displays the channel number (e.g., "CH 1", "CH 2") and the channel name (e.g., a character string such as "VOCAL 1", "GUITER 2", etc.) of the channel assigned to the channel strip 70-1. A CUE button 6 changes the condition of whether the sound signal of the channel involved with the channel strip 70-1 is contained in the sound signal monitored by a user. Various functions are assigned to a f-button (function button) 6 according to the user's designation. An SEL button 10 designates the channel as the selected channel.

Figure 7A:
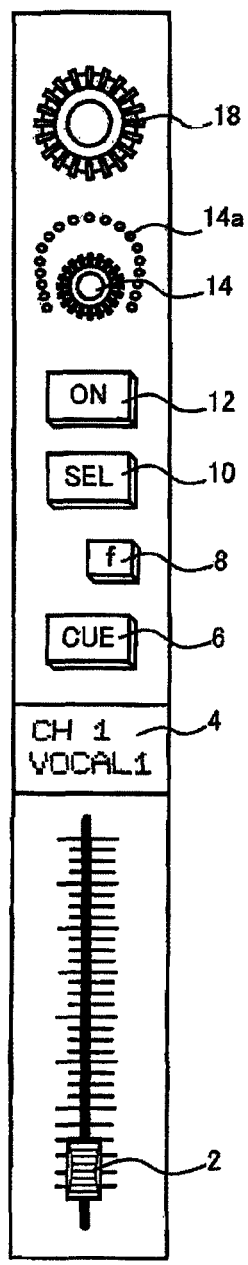
FIG. 7A is an enlarged view of the channel strip on the main console.

An on/off button 12 is used to change the on/off state (on/off state of the stereo send on/off changeover section 158, and the on/off changeover section 184) of the overall of the channel. Knobs 14 and 18 increase or decrease the assigned parameter, when turned by a user. FIG. 7A is an enlarged view of the channel strip 70-1. As illustrated in FIG. 7A, an LED group 14a including plural LEDs is arranged in a horseshoe shape around the knob 14. The LED group 14a displays the level of the parameter involved with the knob 14 by its lighting state. On the other hand, the LED group is not arranged around the knob 18. This is because the level of the parameter assigned to the knob 18 is displayed on the display formed immediately above the knob 18 (the detail will be described later).

On the other hand, the parameter involved with the knob 14 can be set regardless of the content of the display. Therefore, the exclusive LED group 14a is arranged around the knob 14. The above-mentioned buttons 6, 8, 10, and 12 are made of a substantially transparent member having an LED embedded therein. The embedded LED is turned on or off according to the on/off state of the parameter involved with the respective buttons 6, 8, 10, and 12. When the layer is changed, the LED group 14a changes its light-on/light-off state on the basis of the value (level) of the parameter at the newly assigned channel. The LED in each of the buttons 6, 8, 10, and 12 changes its light-on/light-off state on the basis of the value (level) of the parameter at the newly assigned channel. The configuration of the channel strip 70-1 has been described above. The channel strips 70-2 to 70-16 are configured to be same as that of the channel strip 70-1.

Returning back to FIG. 5, a compact display 74 is composed of a dot matrix display and a touch panel adhered onto the top surface thereof. The compact display 74 is used to display and operate for a scene recall and user definition function. Channel strips 76-L and 76-R exclusively for the stereo output channel section 120 are provided. These channel strips 76-L and 76-R are provided with the components 2, 6, 8, 10, and 12 that are the same as those in the channel strips 70-1 to 70-16. Since the channel strips 76-L and 76-R are exclusively for the stereo output channel section 120, the character display section 4 is not provided, and further, the knobs 14 and 18 are not provided, since there is no need to adjust the send-level.

Figure 4:
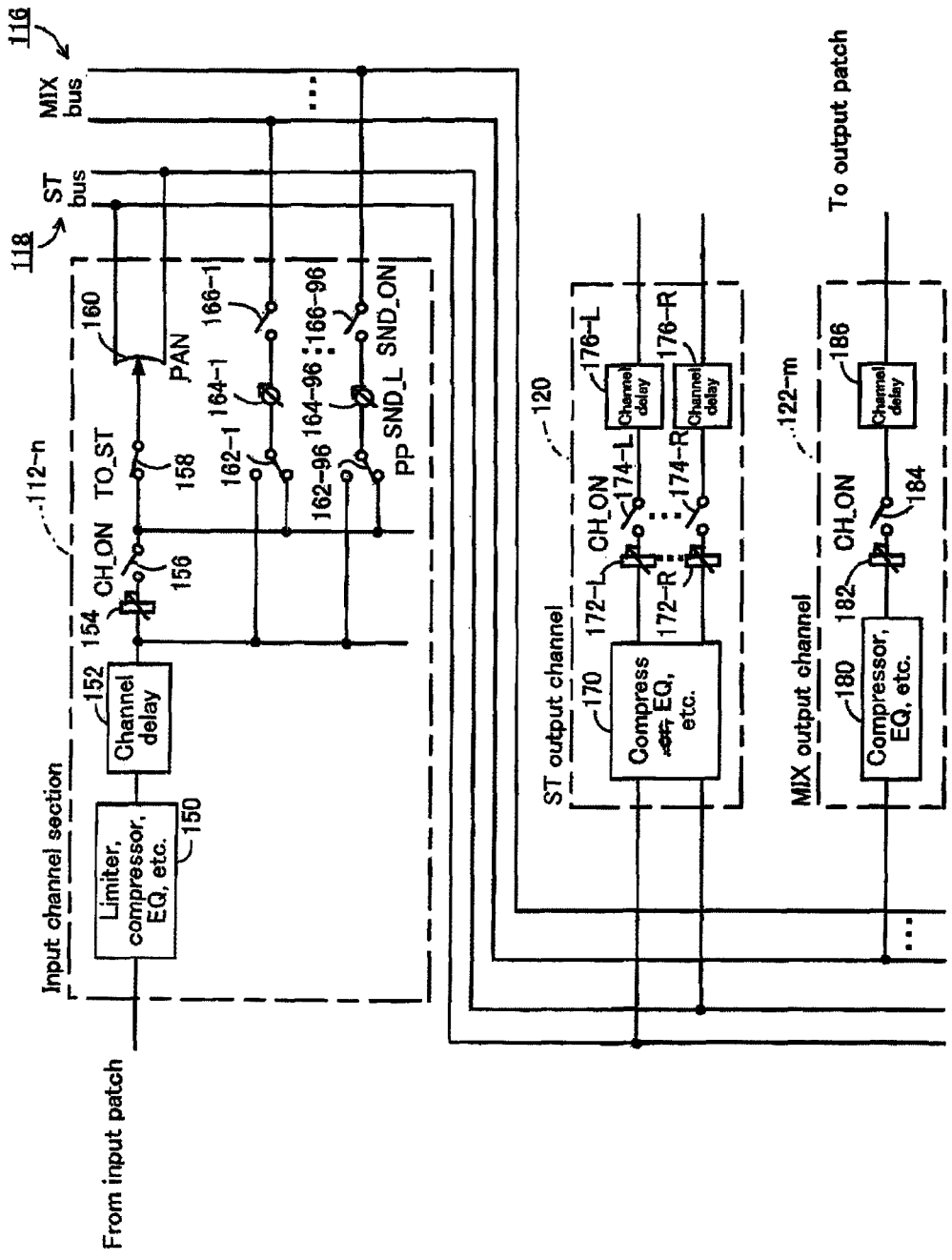
FIG. 4 is a block diagram of an essential part of the algorithm.

At the rear panel 1104 of the main console 1100, when the selected channel is the input channel, a send-level adjusting section 80 sets a send level (the gain of the send-level adjusting sections 164-1 to 164-96 in FIG. 4) from the selected channel to each of the MIX buses. The above-mentioned sound quality adjusting section 72 and the send-level adjusting section 80 are collectively referred to as a "selected channel adjusting section (72, 80)". The meaning of forming the selected channel adjusting section (72, 80) will be described. Since the channel strip 70-1 and other strips have the operation devices in a limited number, it takes much labor for adjusting all signal processing parameters of the assigned channels. In view of this, the selected channel adjusting section (72, 80) is provided in order to simply adjust the various parameters of the assigned channels. When the user pushes down the SEL button 10 at any one of the channel strips, the channel assigned to the channel strip is selected as the selected channel, and assigned to the selected channel adjusting section (72, 80). As described above, the selected channel adjusting section (72, 80) has a great number of operation devices in order to adjust the various parameters of the selected channel. Therefore, when the parameter is set with the use of these operation devices, working efficiency in setting the parameter can be enhanced.

The selected channel is exclusively selected, and only one channel can always be designated for all input channels in the system. In other words, the channel selected by the SEL button 10 becomes the sole selected channel among all channels of the same type. When a certain channel is set as the selected channel, the SEL button 10 is lighted on at the channel strip to which the channel is assigned, and all the other SEL buttons 10 are lighted off. Each of left and right main displays 82 and 84 is composed of a dot matrix display and a touch panel adhered onto the top surface thereof. The left and right main displays 82 and 84 are divided into plural areas, each area having a different function. A selected channel area 82*a* is formed at the left end of the left main display 82. It displays and sets the various parameters of the selected channel together with the sound quality adjusting section 72 and the send-level adjusting section 80.

On navigation areas 82*b* and 84*b*, icons corresponding to each layer ("8" layers of the input channel, "6" layers of the MIX output channel, and "4" layers of the matrix output channel) are displayed. When the user pushes down any one of the icons, "16" channels belonging to the layer is assigned to the main channel strip group 70. Channel display areas 82*e* and 84*e* are composed of "8" frames each (16 in total) formed at the position (the same position in the side-to-side direction) opposite to each channel strip 70-1 to 70-16. The channel number and the channel name of the channel assigned to the corresponding channel strips 70-1 to 70-16 are displayed in each frame.

Figure 9A:
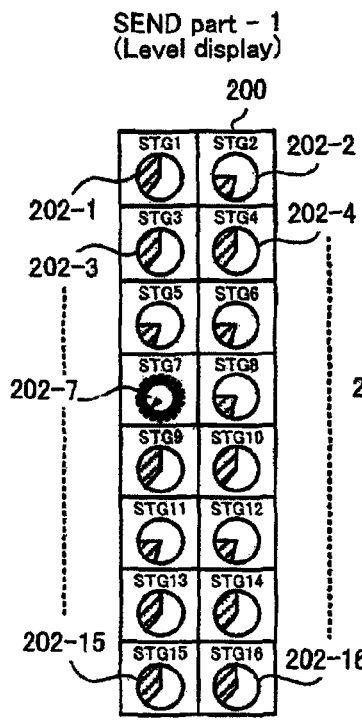
FIG. 9A is a view illustrating a level display example of a SEND part.
Figure 9B:
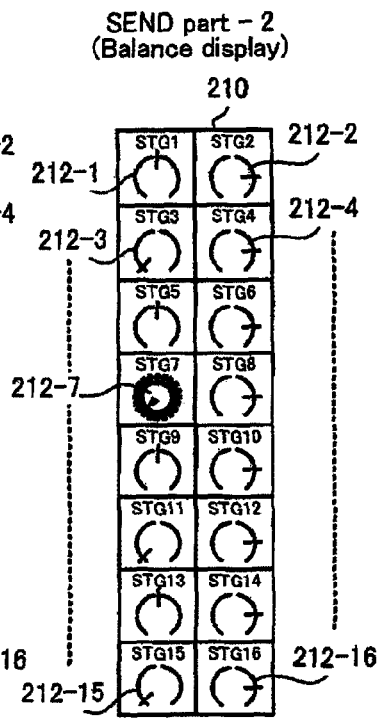
FIG. 9B is a view illustrating a balance display example of the SEND part.
Figure 9C:
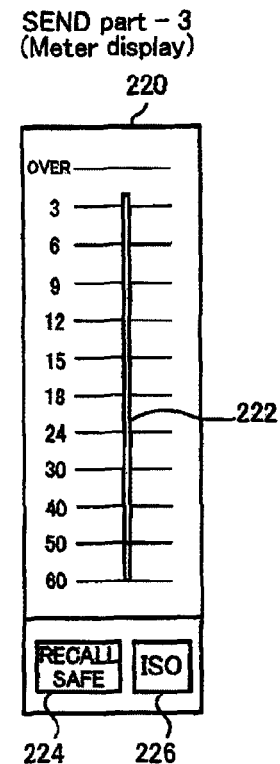
FIG. 9C is a view illustrating a meter display example of the SEND part.
Figure 9D:
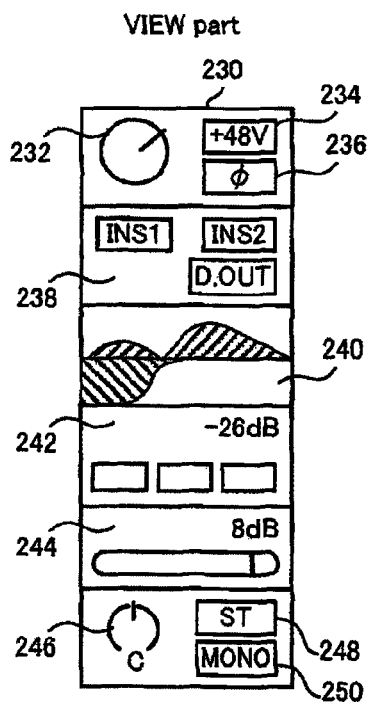
FIG. 9D is a view illustrating an example of an image of a VIEW part.

Parameter areas 82*c* and 84*c* are composed of "8" frames each ("16" frames in total) formed so as to be adjacent to each frame of the channel display areas 82*e* and 84*e* (the same position in the side-to-side direction). The contents of the various parameters and buttons for setting the various parameters involved with the corresponding channel strips 70-1 to 70-16 are displayed in each frame. The image displayed on the parameter areas 82*c* and 84*c* is classified into a VIEW part image and a SEND part image. The images in both parts are arranged in the front-to-rear direction (or vertical direction). The area in the parameter areas 82*c* and 84*c* where the SEND part image is displayed is referred to as a SEND part image area, while the area where the VIEW part image is displayed is referred to as a VIEW part image area. The VIEW part image is as illustrated in FIG. 9D, while the SEND part image is any one of the images illustrated in FIGS. 9A to 9C. These images will be described in detail later.

3.3 Sub-Console 1200

Returning back to FIG. 5, lower channel strips 40-1 to 40-16 provided on the front panel 1202 of the sub-console 1200 are provided with the components 2, 4, 6, 8, 10, 12, and 14, which are similar to those of the channel strips 70-1 to 70-16 of the main console 1100. These components 2, 4, 6, 8, 10, 12, and 14 are arranged so as to be on the same line of the same component of the main console 1100. Specifically, they are arranged in such a manner that the position of each of the components becomes equal to the corresponding component in the front-to-rear direction. The lateral width of each of the lower channel strips 40-1 to 40-16 is the same as the width of each of the channel strips 70-1 to 70-16. Thus, an operator can operate the lower channel strips 40-1 to 40-16 with the operation feeling same as that obtained when operating the channel strips on the main console 1100. The lower channel strips 40-1 to 40-16 are collectively referred to as a "lower channel strip group 40".

"16" knobs 18 are provided so as to be adjacent to the lower channel strips 40-1 to 40-16 at the rear thereof. These knobs 18 are arranged on the same line of the knobs 18 on the main console 1100, i.e., arranged in such a manner that the position of the knobs 18 is the same as the position of the knobs 18 on the main console 1100 in the front-to-rear direction. However, the knobs 18 are not included in the lower channel strips 40-1 to 40-16 on the front panel 1202 of the sub-console 1200. The reason is as follows. Specifically, since the knobs 18 are shared by the layer assigned to the front panel 1202 and the layer assigned to the rear panel 1206, the knobs 18 may have a function irrelevant to the channel assigned to the lower channel strip group 40. A lower layer selecting section 44 is composed of buttons for selecting the layer that is to be assigned to the lower channel strip group 40.

Figure 7B:
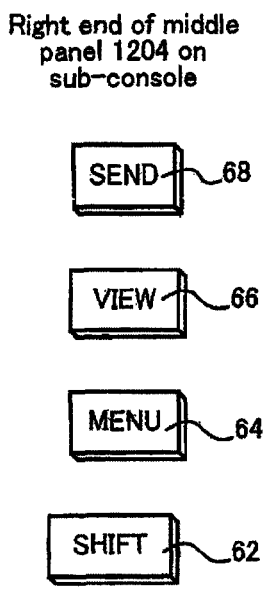
FIG. 7B is an enlarged view of plural buttons on the sub-console.
Figure 7C:
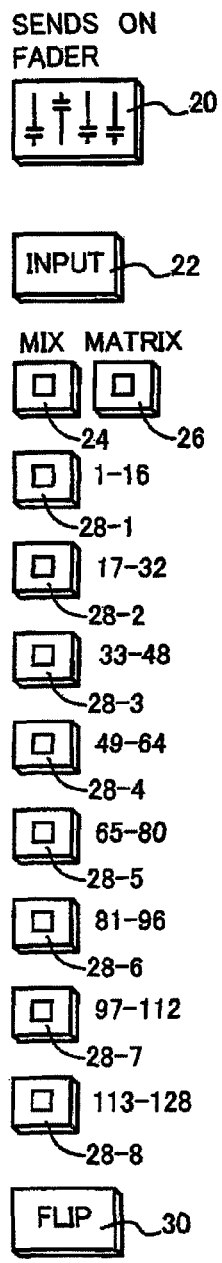
FIG. 7C is a view illustrating the detailed structure of a lower layer selecting section on the sub-console.

The detailed configuration of the lower layer selecting section 44 will be described with reference to FIG. 7C. In FIG. 7C, a sends on fader button 20 switches the function of the electric fader 2 and the function of the knobs 14 at the lower channel strips 40-1 to 40-16. Layer type selecting buttons 22, 24, and 26 select the type (input channel, MIX output channel, or matrix output channel) of the layer assigned to the lower channel strip group 40. The selected button is lighted on with green, and the other two buttons are lighted on with white. Layer number selecting buttons 28-1 to 28-8 select any one of the first to eighth layers of the type selected by the selecting buttons 22 to 26. The button involved with the selected layer is lighted on with green The buttons involved with the present (selectable) layers of the other buttons are lighted on with white, while the buttons involved with the layers not present (layers that cannot be selected) are lighted off.

As described above, only "6" layers are formed to the MIX output channels in the present embodiment. Therefore, when the MIX output channel is selected as the type of the layer, the layer number selecting buttons 28-7 and 28-8 are lighted off, whereby the operations for these buttons 28-7 and 28-8 are neglected. Similarly, since only "four" layers are formed to the matrix output channel, the layer number selecting buttons 28-5 to 28-8 are lighted off, and the operations for these buttons 28-5 to 28-8 are neglected, when the matrix output channel is selected as the type of the layer. A flip button 30 is used to change the layer assigned to the upper and the lower channel strip groups 42 and 40.

Returning back to FIG. 5, upper channel strips 42-1 to 42-16 provided on the rear panel 1206 of the sub-console 1200 are provided with the components 2, 6, 8, 10, and 12, which are similar to those of the channel strips 70-1 to 70-16 of the main console 1100. The upper channel strips 42-1 to 42-16 are collectively referred to as an "upper channel strip group 42". It is to be noted that the character display device 4, knobs 14 and 18 on the main channel strip group 70 are not provided on the upper channel strip group 42. The reason is as follows. Even if the character display device is provided on the upper channel strip group 42 between the electric fader 2 and the CUE button 6, the character display device is located at the position a user is difficult to see. Further, since the channel number and the channel name involved with the upper channel strips 42-1 to 42-16 are displayed on the middle panel 1204 as described later, the character display device in the channel strip is omitted. The knob 18 on the front panel 1202 is commonly used for the upper channel strip group 42, so that the knob 18 is not provided on the upper channel strip group 42. The knob 14 is not provided, since, if it is provided, it is located at the position where a user is difficult to operate.

The components in the upper channel strip 42-*n* (1≦n≦16) are arranged on the same line of the corresponding components in the lower channel strip 40-*n*. Specifically, the components in the upper channel strip 42-*n* are arranged at the position same as the corresponding components in the lower channel strip 40-*n* in the lateral direction. Accordingly, the width of the upper channel strip 42-*n* is equal to the width of the lower channel strip 40-*n*. Thus, an operator can operate the upper channel strips 42-1 to 42-16 with the operation feeling same as that obtained when operating the channel strips on the main console 1100 and on the front panel 1202 of the sub-console 1200. An upper layer selecting section 46 selects the layer that is to be assigned to the upper channel strip group 42. The upper layer selecting section 46 is provided with the buttons 22 to 26, and 28-1 to 28-8 illustrated in FIG. 7C, as in the lower layer selecting section 44. The sends on fader button 20 and the flip button 30 are not provided on the upper layer selecting section 46.

As described above, the layers assigned to the channel strip groups 40 and 42 and the channel strip group 70 are respectively set at the respective layer selecting sections 44 and 46 and the navigation areas 82*b* and 84*b*. The selection of the layers is independent. Therefore, the same layer can be assigned to the channel strip groups 40 and 42 and the channel strip group 70. In this case, when the operation device (e.g., electric fader 2) of the channel at any one of the channel strip groups 40 and 42 and the channel strip group 70 is operated, the parameter (e.g., fader level) of the channel is changed on the basis of the result of the operation, and the operation amount (e.g., the operating position of the electric fader 2) corresponding to the other channel strip group is automatically changed with the change in the parameter.

On the middle panel 1204 of the sub-console 1200, each of left and right displays 52 and 53 is composed of a dot matrix display and a touch panel adhered onto the top surface thereof. As viewed from plane when the main console 1100 and the sub-console 1200 are arranged side by side in the lateral direction as illustrated in FIG. 5, the lower side (front end) of the left and right main displays 82 and 84 of the main console 1100 are aligned to the lower side (front end) of the left and right displays 52 and 54 of the sub-console 1200. The left and right main displays 52 and 54 are divided into plural areas. Upper channel display areas 52*a* and 54*a* are provided at the upper part of the left and right displays 52 and 53. Each of the upper channel display areas 52*a* and 54*a* is composed of "8" ("16" in total of both upper channel display areas 52*a* and 54*a*) frames formed at the position (the same position in the lateral direction) facing the corresponding channel strips 40-1 to 40-16 and 42-1 to 42-16. The channel number and the channel name of the channel assigned to the upper channel strips 42-1 to 42-16 of the rear panel 1206 are displayed in each frame. The upper channel display areas 52*a* and 54*a* are arranged at the position adjacent to the rear panel 1206. An operator easily confirms which channel is assigned to each of the upper channel strips 42-1 to 42-16, if the upper channel display areas 52*a* and 54*a* are arranged as described above, since each channel assigned to the upper channel strip group 42 provided on the rear panel 1206 is displayed on the upper channel display areas 52*a* and 54*a*.

Lower channel display areas 52*c* and 54*c* are provided at the lower part of the left and right displays 52 and 54. The lower channel display areas 52*c* and 54*c* are composed of "16" frames in total formed at the position (the same position in the lateral direction with respect to each frame of the upper channel display areas 52*a* and 54*a*. The channel icons of the channels assigned to the lower channel strips 40-1 to 40-16 of the front panel 1202 are displayed on each frame. The channel number and the channel name are displayed on the channel icon. The lower channel display areas 52*c* and 54*c* are arranged at the position adjacent to the front panel 1202. An operator easily confirms which channel is assigned to each of the lower channel strips 40-1 to 40-16, if the lower channel display areas 52*c* and 54*c* are arranged as described above, since each channel assigned to the lower channel strip group 40 provided on the front panel 1202 is displayed on the lower channel display areas 52*c* and 54*c*. The other areas of the left and right displays 52 and 54 other than the above-mentioned areas are parameter areas 52*b* and 54*b*. The parameter areas 52*b* and 54*b* are composed of "16" frames in total formed at the position (the same position in the lateral direction) along the vertical direction (front-to-rear direction) with respect to each frame of the upper channel display areas 52*a* and 54*a* and the lower channel display areas 52*c* and 54*c*. The content of the various parameters and the buttons for setting the various parameters involved with either one of the channel (hereinafter referred to as a lower channel) corresponding to the lower channel strip group 40 and the channel (hereinafter referred to as an upper channel) corresponding to the upper channel strip group 42 are displayed in the parameter areas 52*b* and 54*b*.

Since the left and right displays 52 and 54 are shared by the upper and lower channel strip groups 42 and 40 as described above, the display is not provided above (or at the rear of) the upper channel strip group 42. The nth frames from the left end in the lower channel strip 40-*n* (1≦n≦16), the upper channel strip 42-*n*, and the parameter areas 52*b* and 54*b* are arranged at the same position in the lateral direction viewed from the front, and have the same width. Plural buttons 62 to 68 are provided at the right side of the right display 54. The detail is illustrated in FIG. 7B. A MENU button 64 is used to display a menu for making various settings to the left and right displays 52 and 54, when this button 64 is depressed. A VIEW button 66 and a SEND button 68 are used to change the parameter that is to be displayed in the parameter areas 52*b* and 54*b*.

When a SHIFT button 62 is depressed with the buttons 64, 66, and 68, it changes the functions of the buttons 64, 66, and 68. The left and right displays 52 and 54 provided on the sub-console 1200 are smaller in size than the left and right main displays 82 and 84 provided on the main console 1100, and the depth (the length in the front-to-rear direction) is smaller than that of the left and right main displays 82 and 84. Therefore, it is impossible to display both VIEW part image and the SEND part image on the parameter areas 52*b* and 54*b*, as on the parameter areas 82*c* and 84*c* of the main console 1100. Accordingly, one of the VIEW part image and the SEND part image is selected, and the selected image is displayed. The part (the VIEW part or the SEND part) displayed on the sub-console 1200 is referred to as a "display part" below. The VIEW button 66 is used to select the VIEW part as the display part. The SEND button 68 is used to select the SEND part as the display part.

Figure 8A:
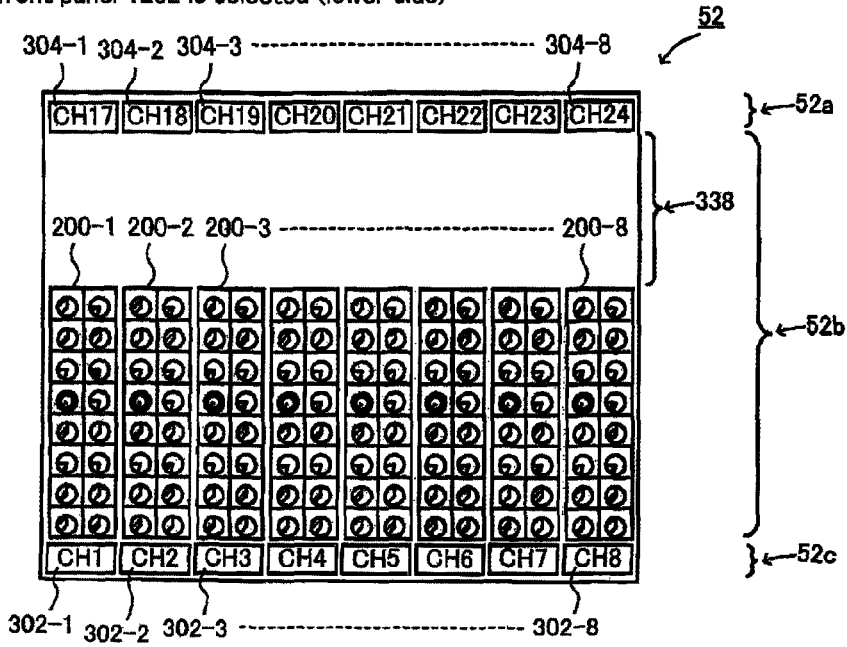
FIG. 8A is a view illustrating a display example on a left display when a front panel of the sub-console is selected.
Figure 8B:
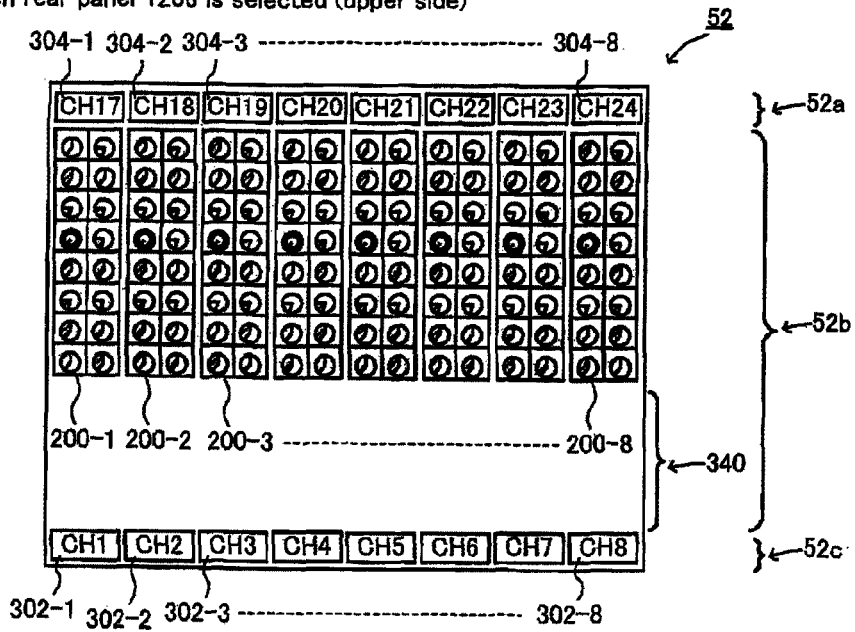
FIG. 8B is a view illustrating a display example on the left display when a rear panel of the sub-console is selected.

FIGS. 8A and 8B illustrate the example of the display on the left display 52. Since the left and right displays 52 and 54 are shared by the front and rear panels 1202 and 1206 (or by the upper and lower channel strip groups 42 and 40), it is necessary to specify which side is displayed. The side of the front panel 1202 (the lower channel strip group 40) is referred to as a "lower side", while the side of the rear panel 1206 (the upper channel strip group 42) is referred to as an "upper side". Further, the side of the "upper side" and the "lower side" on which the parameter is displayed is referred to as a "display side", and side on which the parameter is not displayed is referred to as a "non-display side". In FIGS. 8A and 8B, it is supposed that the input first layer ($1^{st}$ to $16^{th}$ input channels) is assigned to the lower channel strip group 40 (see FIG. 6), while the input second layer ($17^{th}$ to $32^{nd}$ input channels) is assigned to the upper channel strip group 42.

Therefore, the channel numbers "CH1" to "CH8" of the first-half "8" channels of the input first layer are displayed on the channel icons 302-1 to 302-8 of the lower channel display area 52c. The channel numbers "CH17" to "CH24" of the first-half "8" channels of the input second layer are displayed on the channel icons 304-1 to 304-8 of the upper channel display area 52a. In FIG. 8, only the channel numbers are displayed in the channel icons 302-1 to 302-8 and 304-1 to 304-8 because of making the figure, but actually, the channel number and the channel name are displayed on each channel icon.

In FIG. 8A, "8" SEND part images 200-1 to 200-8 are displayed in the parameter area 52b. These SEND part images correspond to the front panel 1202 (the lower channel strips 40-1 to 40-8). In order to indicate the correspondence described above, the SEND part images 200-1 to 200-8 are displayed in intimate contact with the channel icons 302-1 to 302-8 involved with the lower channel strips 40-1 to 40-8, and a rectangular non-display section 338 that is painted over with black is formed between the channel icons 304-1 to 304-8 and the SEND part images 200-1 to 200-8. On the other hand, when the SEND part images 200-1 to 200-8 corresponding to the upper channel strips 42-1 to 42-8 are displayed on the parameter area 52b, the displayed state is as illustrated in FIG. 8B.

In FIG. 8B, the SEND part images 200-1 to 200-8 are displayed in intimate contact with the channel icons 304-1 to 304-8 involved with the upper channel strips 42-1 to 42-8 in order to indicate that the SEND part images 200-1 to 200-8 correspond to the rear panel 1206 (the upper channel strips 42-1 to 42-8), and a rectangular non-display section 340 that is painted over with black is formed between the channel icons 302-1 to 302-8 and the SEND part images 200-1 to 200-8. In the right display 54, the image same as that described above is displayed for the remaining channels ($9^{th}$ to $16^{th}$, and $25^{th}$ to $32^{nd}$ channels). Displaying the rectangular black image in order to form the non-display sections 338 and 340 is, in other words, equal to the generation of "a space in which nothing is displayed". The display manner in the parameter area 52b described above means that the various parameters are displayed in such a manner that they are made close to the side (upper side or lower side) displayed on the parameter area 52b.

The term "made close to" means that the display content is associated with the displayed side or the side of the display side. The term "associated with" means that the section where the parameter is displayed (in the above example, the SEND part images 200-1 to 200-8) is made continuous with the channel display at the display side or the side of the display side, and the display is discontinuous with the non-displayed side (the other side). As a result, the spaces where nothing is displayed (the non-displayed sections 338 ant 340) are formed between the non-displayed side and the portion where the parameters are displayed. Specifically, "the distance between the side of the display side and the side of the parameter displayed as being most proximate to the side" is shorter than "the distance between the side of the non-displayed side and the side of the parameter displayed as being most proximate to the side". More specifically, the term "made close to" means that the portion where the parameters are displayed is displayed as being closer to the selected one of the front panel 1202 and the rear panel 1206 than to the non-selected one. There is no space formed between the side (upper side or lower side) of the parameter areas 52b and 54b proximate to the selected panel and the portion where the parameters are displayed. More strictly, the space is formed between the side proximate to the selected panel and the parameter-displayed portion, but compared to the space between the side proximate to the non-selected panel and the parameter-displayed portion, the width is extremely narrow, so that it is negligible. Therefore, this space does not correspond to the "space" described in the claims.

4. Specific Example of Various Images

The specific examples of the various images displayed on the parameter areas 82c and 84c of the main console 1100 and the parameter areas 52b and 54b of the sub-console 1200 will be described next with reference to FIGS. 9A to 9E. In the SEND part, one type of SEND part image is selected among plural types of images according to the designated "display mode". FIGS. 9A to 9C illustrate the SEND part images 200, 210, and 220 that are the specific examples. When the corresponding channel strip is assigned to the input channel, the SEND part image 200 illustrated in FIG. 9A is used to display and set the send level to each MIX bus from the input channel.

As described above, the MIX buses 116-1 to 116-96 of "96" systems are provided in the present embodiment. The pair of two systems, such as the pair of the MIX buses 116-1 and 116-2, and the pair of the MIX buses 116-3 and 116-4, can form a "stereo group". The character strings of "STG1" and "STG2" in the SEND part image 200 represent the number of the stereo group. Level display images 202-1 to 202-16 display the send levels (the average value of the send levels for the MIX buses of two systems that make a pair) of the stereo groups STG1 to STG16 in the form of a circle graph.

When a user depresses any one of the level display images 202-1 to 202-16, the depression is detected by a touch panel, and the corresponding stereo group is brought into the "selected state". The level display image corresponding to the stereo group that is brought into the selected state is changed to an image like a knob. In the example in the figure, the stereo group STG7 involved with the level display image 202-7 is in the selected state. As for the stereo group that is in the selected state, its parameter (in this case, the send level) can be adjusted by the knob 18 that is arranged immediately below the SEND part image 200.

The SEND part image 210 illustrated in FIG. 9B is used to display and set a PAN (a sound volume balance at left and right) for the above-mentioned each stereo group. PAN display images 212-1 to 212-16 display the sound volume balance at the left and right of the stereo groups STG1 to STG16 by an arc-like image and a short line segment indicating the sound image on the arc-like image. Similar to the SEND part image 200 (similar to the case of displaying a level), when the user depresses any one of the PAN display images 212-1 to 212-16, the depression by the user is detected by the touch panel, and the corresponding stereo group is brought into the "selected state". The PAN display image corresponding to the stereo group that is brought into the selected state is changed to an image like a knob. As for the stereo group that is in the selected state, its PAN can be adjusted by the knob 18 that is arranged immediately below the SEND part image 210.

The SEND part image 220 illustrated in FIG. 9C is used to display the output level of the channel assigned to the corresponding channel strip. A meter image 222 displays the output level. The output level is the level of the sound signal actually outputted, so that the height of the meter image 222 changes from moment to moment. A recall safe button 224 changes the on/off state of a scene recall mode, which designates whether the channel is removed from the target of the scene recall or not, by a toggle, when depressed by the user.

The VIEW part image 230 illustrated in FIG. 9D is used to mainly display the setting state of the corresponding channel. In the VIEW part image 230, a microphone power source display section 234 displays whether a power source of "+48 V" is supplied from the microphone controller 1400 to the microphone 1402 (see FIG. 1) that corresponds to the channel. A phase display section 236 displays whether the phase of the sound signal is inverted at "180°" at the sound quality adjusting sections 150, 170, and 180 (see FIG. 4) of the channel. A frequency characteristic display section 240 displays the frequency characteristic set at the sound quality adjusting section 150, 170, and 180 by a graph. The parameters displayed on the VIEW part image 230 cannot directly be edited with the use of the VIEW image. When these parameters are edited, a special operation is needed, i.e., the sound quality adjusting section 72 (see FIG. 5) or the selected channel area 82a has to be operated.

Figure 9E:
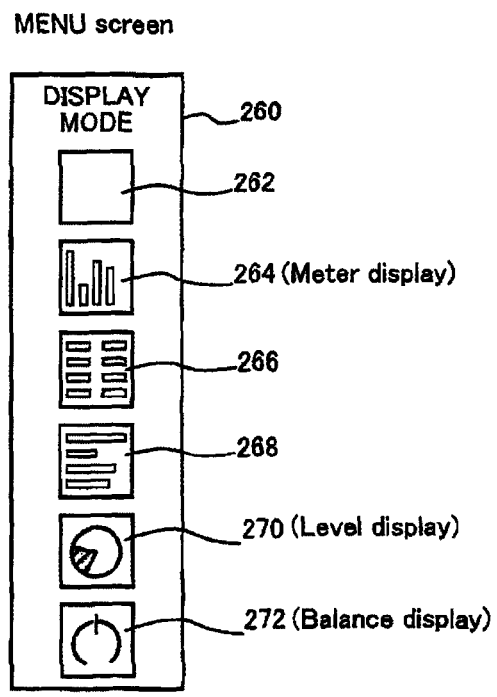
FIG. 9E is a view illustrating an example of a MENU screen.

The MENU image 260 illustrated in FIG. 9E is an image displayed at the right end part of the right display 54, when the MENU button 64 (see FIG. 7B) on the sub-console 1200 is depressed. It is used to set the display mode in the SEND part. Specifically, button images 262 to 272 corresponding to the various display modes are displayed on the MENU image 260. When any one of the images is depressed, the depression is detected by the touch panel, and the display mode corresponding to the button image is selected. The button images 262, 270, and 272 of these button images correspond respectively to the operation mode (SEND part images 220, 200, and 210) of the meter display, the level display, and the balance display as described above. The MENU image 260 is a pop-up image. The MENU image 260 is displayed as overlapped with the VIEW part image or the SEND part image (displayed as covering a part of the VIEW image or the SEND image). After the MENU image 260 is closed, the original VIEW part image or the SEND part image is returned.

5. Data Structure in Embodiment

5.1 Signal Processing Parameter

Figure 10A:
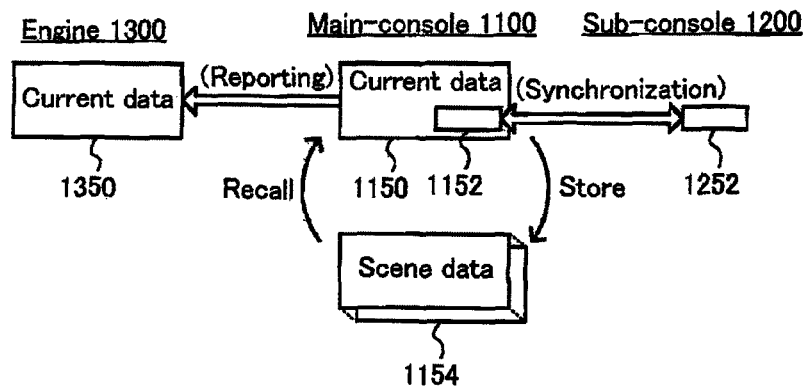
FIG. 10A is a view illustrating a data structure of a signal processing parameter.

Next, the data structure in the present embodiment will be described. Firstly, the data structure of the signal processing parameter will be described with reference to FIG. 10A. "The signal processing parameter" is a constant for determining the gain of the various signals, on/off state of switches, and the property of the limiter, compressor, equalizer, etc in the algorithm illustrated in FIGS. 3 and 4. The signal processing parameter indicates all parameters giving an influence to the sound signal in the algorithm. With respect to the group of the signal processing parameters, the set of the parameter values currently set (the parameter values that are currently set to the DSP 1326 in the engine 1300 and adapted to use for the signal process) is referred to as "current data". The current data 1150 is stored in the predetermined area (current area) in the memory 1116 of the main console 1100.

The current data at a certain point can be stored in the other area (scene area) in the memory 1116 as scene data 1154. The plural types of the scene data pieces can be stored, wherein an optional scene data piece can be returned to the current area by the predetermined operation. This operation is referred to as a "scene recall". With this scene recall, the signal processing parameter in a new scene can be reproduced with one-touch, in the case of scene change. The current data 1350 is also stored in the memory 1316 in the engine 1300, and the parameter of the DSP 1326 is set on the basis of the current data 1350. When the engine 1300 is started, the current data 1150 is copied from the main console 1100, whereby the current data 1350 becomes the same as the current data 1150. Thereafter, when the current data 1150 is changed by the operation of the various operation devices at the consoles 1100 and 1200 or by the scene recall, the changed content is immediately reported to the engine 1300 so as to reflect the changed content on the current data 1350 in the engine 1300. In this way, the current data 1150 and the current data 1350 are in synchronism with each other for keeping the constant content.

Since two layers are selected by the layer selecting sections 44 and 46 on the sub-console 1200, a signal processing parameter 1252 of the current data, which is the section involved with the two layers, is stored in the memory 1216. When the parameter 1252 is changed by the operation of the sub-console 1200, the changed content is immediately reported to the main console 1100, and the current data 1150 (the signal processing parameter 1152 corresponding to the parameter 1252) is changed so as to reflect the changed content. On the contrary, when the parameter 1152 is changed at the main console 1100, the changed content is immediately reported to the sub-console 1200, and the parameter 1252 is changed so as to reflect the changed content. In this way, the operation of securing the coincidence and consistency between the data pieces stored in two sections is expressed as "in synchronism with" in the present specification.

5.2 Template for Image Data

The specific examples of the SEND part image have been described above with reference to FIGS. 9A to 9C. These SEND part images are divided into the part that is changed by the signal processing parameter and the constant part. For example, in the SEND part image 200 (level display) in FIG. 9A, the parts of the level display images 202-1 to 202-16 are changed by the signal processing parameter, and the character strings of "STG1 to STG16", which are the name of the stereo group, are changed according to the setting condition of the display range. However, the background part other than the above-mentioned parts is unchanged by the signal processing parameter or the setting condition of the display range. The unchanged part is stored as an image data piece of a so-called "template".

Figure 10B:
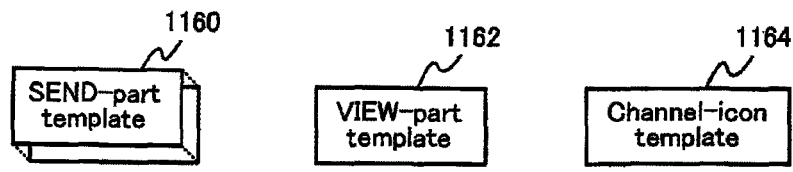
FIG. 10B is a view illustrating an image-data template.

There are also templates in the VIEW part image and the channel icon. FIG. 10B illustrate the list of the templates. Plural types of SEND-part templates 1160 (the same in number as the number of the types of the SEND part images) are provided. On the other hand, only one type each is provided for the VIEW-part template 1162 and the channel-icon template 1164. These templates 1160, 1162, and 1164 are stored respectively in the ROM area in the memory 1116 of the main console 1100 and the ROM area in the memory 1216 of the sub-console 1200.

5.3 Display Control Data

Figure 10C:
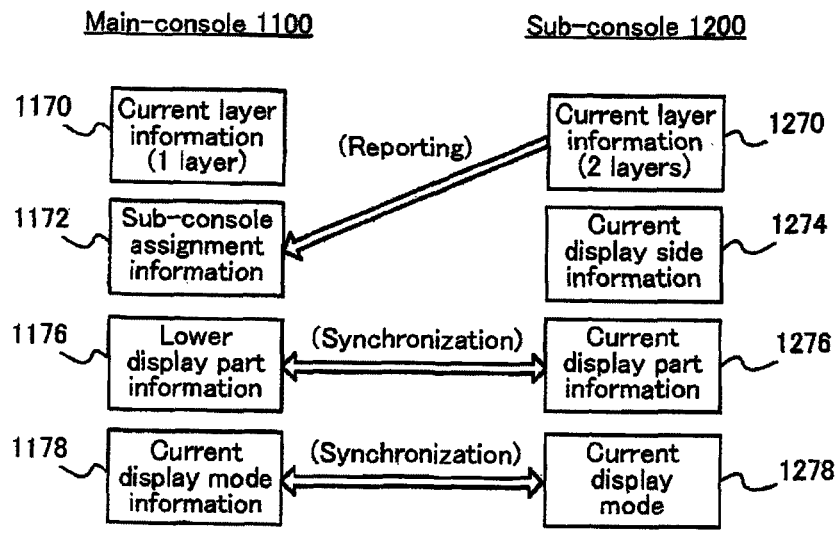
FIG. 10C is a view illustrating a detail of display control data.

The non-volatile area in the memory 1116 of the main console 1100 and the non-volatile area in the memory 1216 of the sub-console 1200 respectively store display control data pieces for performing various display controls. These display control data pieces are retained even when the power sources of the consoles 1100 and 1200 are turned off, and reproduced when the power sources are again turned on. These display control data pieces will be described in detail with reference to FIG. 10C.

In the main console 1100, current layer information 1170 indicates the layer (type of the layer and layer number) that is currently assigned to the main channel strip group 70. Sub-console assignment information 1172 indicates "2" layers (type of the layer and layer number) assigned respectively to one or plural sub-consoles 1200. Lower display part information 1176 indicates which one of the VIEW part or the SEND part is displayed at the lower part of the parameter areas 82c and 84c. Current display mode information 1178 indicates the display mode of the SEND part (indicates which one of the SEND part images illustrated in FIGS. 9A to 9C is selected).

In the sub-console 1200, current layer information 1270 indicates the layer (type of the layer and layer number) that is currently assigned to the upper and lower channel strip groups 42 and 40. Current display-side information 1274 indicates the display side (upper side or lower side) of the parameter areas 52b and 54b where the parameter is displayed. Current display part information 1276 indicates which one of the VIEW part or the SEND part is displayed on the parameter areas 52b and 54b. Current display mode information 1278 indicates the display mode of the SEND part.

When the current layer information 1270 is changed by the layer selection in the sub-console 1200 with the consoles 1100 and 1200 started, the result of the change is immediately reported to the main console 1100, and the sub-console assignment information 1172 is updated so as to reflect the result of the change. The lower display part information 1176 on the main console 1100 and the current display part information 1276 on the sub-console 1200 are in synchronism with each other. The current display mode information 1178 on the main console 1100 and the current display mode information 1278 on the sub-console 1200 are also in synchronism with each other. Specifically, when one of them is updated at one of the consoles, the changed content is reported to the other and reflected. Thus, the lower display part information 1176 and the current display part information 1276 are controlled to always coincide with each other, and the current display mode information 1178 and the current display mode information 1278 are controlled to always coincide with each other.

6. Operation in Embodiment

The operations at the consoles 1100 and 1200 will next be described with reference to the flowcharts. In each flowchart, the process involved with the routine executed at the main console 1100 is represented with "M" attached at the head. The process involved with the routine executed at the sub-console 1200 is represented with "S" attached at the head. The process involved with the routine executed at both of the main console 1100 and the sub-console 1200 is represented with "MS" attached at the head. Specifically, the corresponding program is stored respectively in the memories 1116 and 1216 of the consoles 1100 and 1200 for each routine, and the program is executed by the CPUs 1114 and 1214.

Figure 11A:
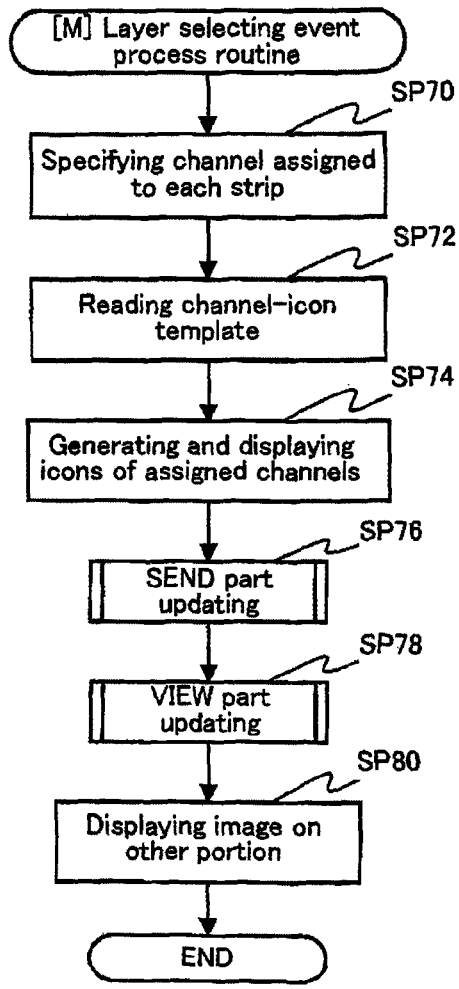
FIG. 11A is a flowchart of a layer selecting event process routine.

6.1 Event Process at Main Console 1100
6.1.1 Event Process for Layer Selection (and Upon the Start) (FIG. 11A)

When the icon designating any one of the layers is depressed in the navigation areas 82b and 84b on the main console 1100, a layer selecting event process routine illustrated in FIG. 11A is started. This routine is also started when the power source of the main console 1100 is turned on, or when a predetermined initialization is performed. In this case, this routine is started as the layer stored as the current layer information being designated.

In FIG. 11A, when the program proceeds to step SP70, the channel assigned to the main channel strip group 70 is specified on the basis of the designated layer. Then, after the program proceeds to step SP72, the channel-icon template 1164 (see FIG. 10B) stored in the ROM area in the memory 1116 is read out, and transferred to the buffer area provided in the RAM area for editing an image. When the program proceeds to step SP74, the channels assigned to the respective channel strips 70-1 to 70-16 are specified on the basis of the current layer information 1170 (see FIG. 10C). Thus, the channel number and the channel name of each of these channels are specified.

Figure 11C:
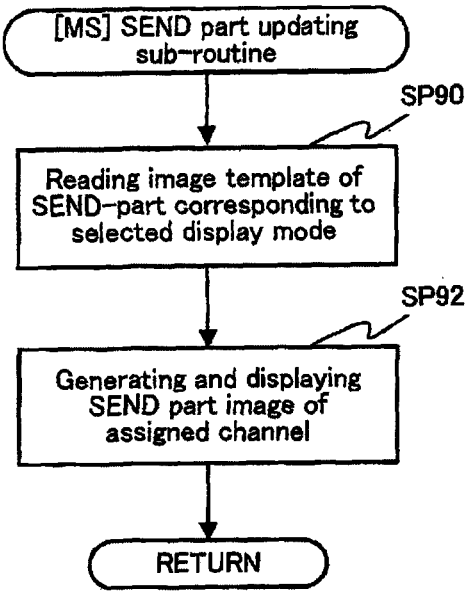
FIG. 11C is a flowchart of a SEND part updating subroutine.

The character image representing the specified channel number and the channel name and the template 1164 in the buffer area are combined, whereby the image of the channel icon corresponding to each channel strip is produced, and these channel icons are displayed on the channel display areas 82e and 84e. Specifically, even when the other image has already been displayed on the channel display areas 82e and 84e, this image is overwritten by the newly produced channel icon image. Subsequently, when the program proceeds to step SP76, a SEND part updating sub-routine illustrated in FIG. 11C is called up. When the program proceeds to step SP90 in FIG. 11C, the SEND-part template 1160 (see FIG. 10B), which should be displayed, is read out on the basis of the current display mode information 1178 (see FIG. 10C), and transferred to the buffer area for editing an image.

When the program proceeds to step SP92, the parameter display image involved with the SEND part is produced on the basis of the signal processing parameter of the corresponding channel (in this case, each channel assigned to the main channel strip group 70), and this parameter display image is combined with the template 1160 in the buffer area, whereby the SEND part image corresponding to each channel strip is produced. These SEND part images are displayed on a predetermined area (in this case, the SEND part image area in the parameter areas 82c and 84c). Specifically, even when the other image has already been displayed on the display area of the SEND part image in the parameter area, this image is overwritten by the newly produced SEND part image. After the above-mentioned process is completed, the program returns to the routine that calls out the present routine (here, the layer selecting event process routine (FIG. 11A)).

Figure 11B:
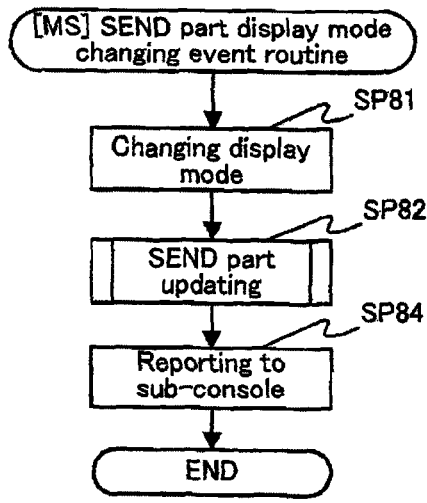
FIG. 11B is a flowchart of a display mode changing event process routine of a SEND part.
Figure 11D:
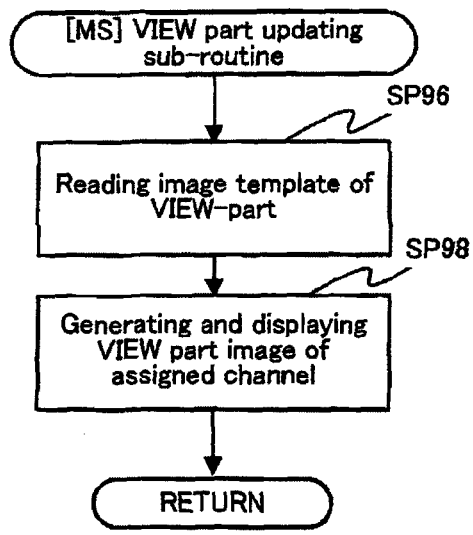
FIG. 11D is a flowchart of a VIEW part updating subroutine.

When the program proceeds to step SP 78 in FIG. 11A, a VIEW part updating sub-routine illustrated in FIG. 11D is called out. When the program proceeds to step SP96 in FIG. 11D, the VIEW-part template 1162 is read out, and transferred to the buffer area for editing an image. Then, when the program proceeds to step SP98, the parameter display image involved with the VIEW part is produced on the basis of the signal processing parameter of the corresponding channel (in this case, each channel assigned to the main channel strip group 70), and this parameter display image is combined with the template in the buffer area, whereby the VIEW part image corresponding to each channel strip is produced. These VIEW part images are displayed on a predetermined area (in this case, the VIEW part image area in the parameter areas 82c and 84c). Specifically, even when the other image has already been displayed on the display area of the VIEW part image in the parameter area, this image is overwritten by the newly produced VIEW part image. After the above-mentioned process is completed, the program returns to the routine that calls out the present routine (here, the layer selecting event process routine (FIG. 11A)). When the program proceeds to step SP80 in FIG. 11A, the image of the portion other than the above-mentioned portions is displayed, and the process of the present routine is completed.

6.1.2 Display Mode Changing Event Process of SEND Part (FIG. 11B)

When a predetermined operation is performed on the main console 1100, the MENU image 260 (see FIG. 9E) is displayed on the right main display 84. When any one of the buttons 262 to 272 in the MENU image 260 is depressed, the SEND part display mode changing event routine illustrated in FIG. 11B is started. When the program proceeds to step SP81, a newly designated display mode is set for the current display mode information 1178 (see FIG. 10C), and the MENU image 260 on the right display 84 is deleted. Next, when the program proceeds to step SP82, the SEND part updating sub-routine (FIG. 11C) is called out so as to display the SEND part image involved with the new display mode.

Accordingly, the SEND part image of the display mode is displayed in the SEND part image area in the parameter areas 82c and 84c. When the program proceeds to step SP84, a message reporting this new display mode is transmitted to one or plural sub-consoles 1200, and then, the process of the present routine is completed. Although the detail is described later, the current display mode information 1278 of the SEND part is changed on each sub-console 1200 since the message is received, whereby the display modes on all consoles 1100 and 1200 are made equal to each other.

Figure 12A:
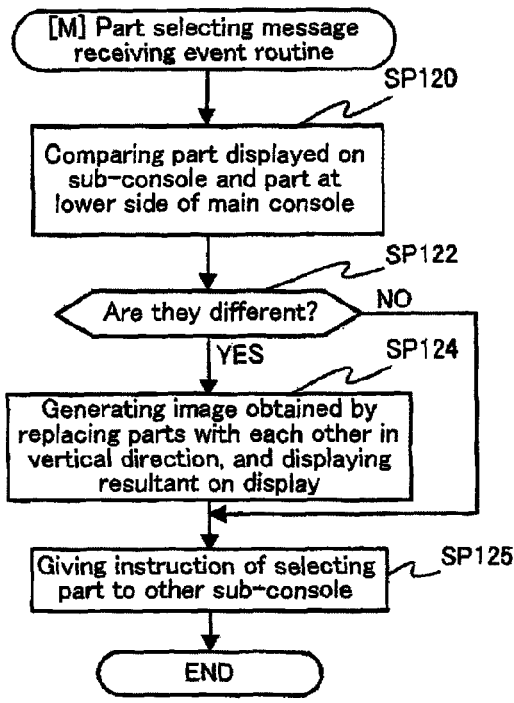
FIG. 12A is a flowchart of a VIEW part selecting event routine.

6.1.3 Reception of Part Selecting Message (FIG. 12A)

Although the detail is described later, when the VIEW button 66 or the SEND button 68 is operated on the sub-console 1200, a message reporting the selected part (VIEW part or SEND part) is transmitted to the main console 1100. When this message is received by the main console 1100, a part selecting message receiving event routine illustrated in FIG. 12A is started on the main console 1100. When the process proceeds to step SP120 in FIG. 12A, it is determined whether the part (VIEW part or SEND part) reported by the message agrees with the part displayed at the lower side of the main console 1100 or not. Specifically, since the image of the VIEW part and the image of the SEND image are arranged side by side in the vertical direction (i.e., front-to-rear direction) on the parameter areas 82c and 84c of the main console 1100, it is determined whether the part displayed at the lower side agrees with the part reported by the message.

When the program proceeds to step SP122, the process is branched according to the result of the determination at the step SP120. When the part displayed at the lower side of the main console 1100 and the part reported by the message are different from each other, the program proceeds to step SP124. At step SP124, the VIEW part image area and the SEND part image area are replaced with each other in the vertical direction, wherein the VIEW part image is overwritten on the VIEW part image area after the replacement, and the SEND part image is overwritten on the SEND part image area after the replacement. In this case, the part (VIEW part or SEND part) newly displayed at the lower side is written on the lower display part information 1176 (see FIG. 10C). As a result, the SEND part image and the VIEW part image, which are replaced with each other in the vertical direction, are displayed on the parameter areas 82c and 84c. On the other hand, when "NO" determination is made at step SP122, the step SP124 is skipped.

When the program proceeds to step SP125, a part selecting message is transmitted to the other sub-console in order to select the part displayed at the lower side of the main console 1100. As described above, plural sub-consoles 1200 can be connected to the main console 1100. Therefore, when the message for selecting the part is transmitted from one of the sub-consoles 1200 to the main console 1100, the part selecting message is transmitted from the main console 1100 to the other sub-consoles 1200. The part selecting message is the one requesting to the sub-console 1200 that the current display part information 1276 is agreed with the value (VIEW part or SEND part) of the lower display part information 1176 of the main console 1100. Thus, the process of the present routine is completed.

Figure 12C:
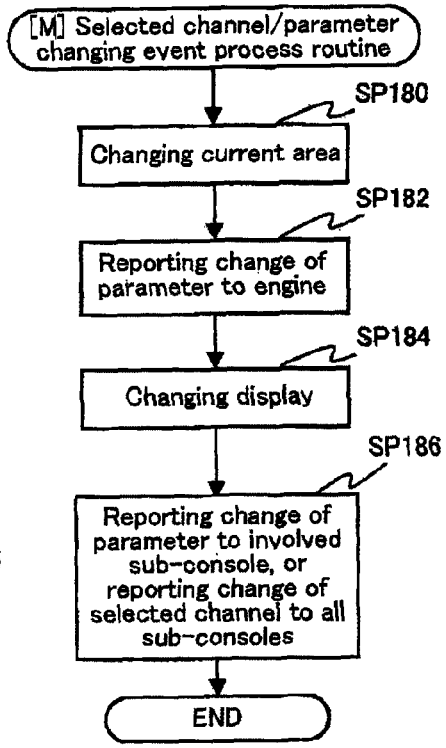
FIG. 12C is a flowchart of an event process routine for changing selected channel/parameter.
Figure 12B:
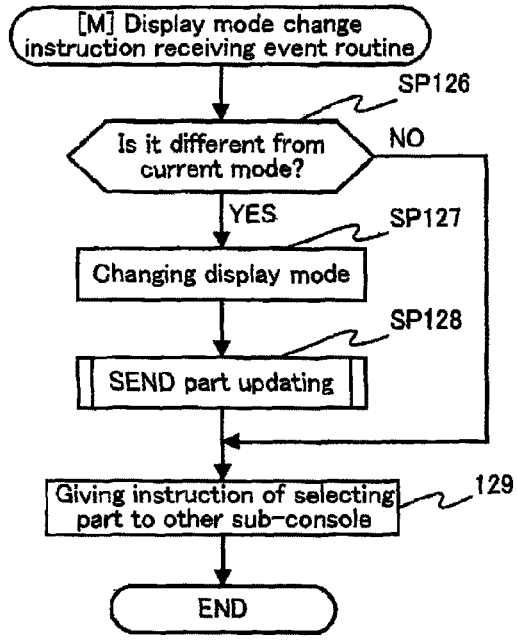
FIG. 12B is a flowchart of a display mode changing instruction receiving event process routine of a SEND part.

6.1.4 Display Mode Change Instruction Receiving Event Process of SEND Part (FIG. 12B)

Although the detail is described later, when the current display mode information 1278 of the SEND part is changed on the sub-console 1200, a message reporting the changed display mode is transmitted to the main console 1100. When this message is received by the main console 1100, a display mode change instruction receiving event routine of the SEND part illustrated in FIG. 12B is started on the main console 1100. When the program proceeds to step SP126 in FIG. 12B, it is determined whether the mode reported by the message is different from the display mode on the main console 1100 or not.

When they are different, "YES" determination is made, and the program proceeds to step SP127. Here, the display mode designated by the message is set to the current display mode information 1178 (see FIG. 10C). When the program proceeds to step SP128, the SEND part updating routine (FIG. 11C) is called out in order that the SEND part image involved with the new display mode is displayed. Accordingly, the SEND part image of the display mode is displayed on the SEND part image area in the parameter areas 82c and 84c.

On the other hand, when "NO" determination is made at the step SP126, the steps SP127 and SP128 are skipped. When the program proceeds to step SP129, a display mode change instruction message, which gives an instruction to select the display mode as the current display mode information 1278 (see FIG. 10C), is transmitted to the sub-consoles other than the sub-console 1200 that transmits the message to the main console 1100. Thus, the process of the present routine is completed.

6.1.5 Event Process for Changing Selected Channel/Parameter (FIG. 12C)

When the operation devices corresponding to the signal processing parameter, such as the electric fader 2, the CUE button 6, the on/off button 12, the knob 14, the knob 18, etc., are operated on the main console 1100, a selected channel/parameter changing event process routine illustrated in FIG. 12C is stated. This routine is also started when the scene recall operation is performed on the main console 1100, when a remote operation is performed from an external device, or when the parameter changing message that reports the change of the parameter is received from the sub-console 1200. The "selected channel" does not directly affect the sound signal depending upon the designation of the selected channel. Therefore, the information designating the selected channel is not included in the "signal processing parameter" but included in the current data 1150. The present routine is started when the selected channel is designated on the main console 1100 (when any one of the SEL buttons 10 is depressed in the main channel strip group 70), or when a selected channel designation requesting message that requests the designation of the selected channel is received from the sub-console 1200.

When the program proceeds to step SP180 in FIG. 12C, the current data 1150 (see FIG. 10A) is updated so as to reflect thereon the operation amount of the operation device, recalled parameter, and the parameter reported from the sub-console 1200 or the external device. In particular, when the present routine is started by the designation of the selected channel, a channel that is newly designated as the selected channel is stored in the current data 1150 instead of the channel stored therein as the selected channel. Specifically, the channel that is designated as the selected channel before is not the selected channel, and the newly designated channel becomes the sole selected channel. When the program proceeds to step SP182, the changed portion of the current data 1150 is reported to the engine 1300. Accordingly, the current data 1350 in the engine 1300 becomes equal to the current data 1150 in the main console 1100. In the engine 1300, the parameters or the like of the DSP 1326 is reset on the basis of the result of the change in the current data 1350, whereby the signal processing parameter is actually reflected on the sound signal. When the present routine is started according to the designation of the selected channel, there is no change in the signal processing parameter. Therefore, the substantial process is not performed at the step SP182.

When the program proceeds to step SP184, the display contents of the left and right main displays 82 and 84 and the display contents of the main channel strip group 70 are changed according to the result of the signal processing parameter and the designation of the selected channel. When the selected channel is designated, in particular, the newly designated channel is assigned to the selected channel adjusting sections (72, 80), i.e., the sound quality adjusting section 72 and the send level adjusting section 80, at the step SP184. Specifically, the display contents of the various display devices and the operation amounts (e.g., the light-on/light-off state of the LED arranged in a horse-shoe shape around the knob) of the various operation devices are updated on the basis of the current signal processing parameter of the new selected channel. When the operation such as the turn of the knob or the depression of the button is carried out at the selected channel adjusting sections (72, 80) afterward, the corresponding signal processing parameter in the new selected channel is changed.

When the program proceeds to step SP186, the changed content of the parameter is reported to the related sub-console 1200. Specifically, the layer assigned to each sub-console is discriminated on the basis of the sub-console assignment information 1172 (see FIG. 10C). When the signal processing parameter 1152 (see FIG. 10A) involved with the layer is changed, the parameter changing message reporting that the signal processing parameter 1152 is changed is reported to the sub-console. When the selected channel is changed, a selected channel changing message reporting the change of the selected channel is reported to all sub-consoles 1200, regardless of the content of the sub-console assignment information 1172. Thus, the process of the present routine is completed. Although the detail is not described, the current display-side information 1274 is updated on the sub-console 1200 by the transmission of the selected channel changing message to the respective sub-consoles 1200, whereby the process of changing the display side is executed according to the situation.

6.2. Event Process of Sub-Console 1200
6.2.1 Set-Up Process (FIG. 13)

Figure 13:
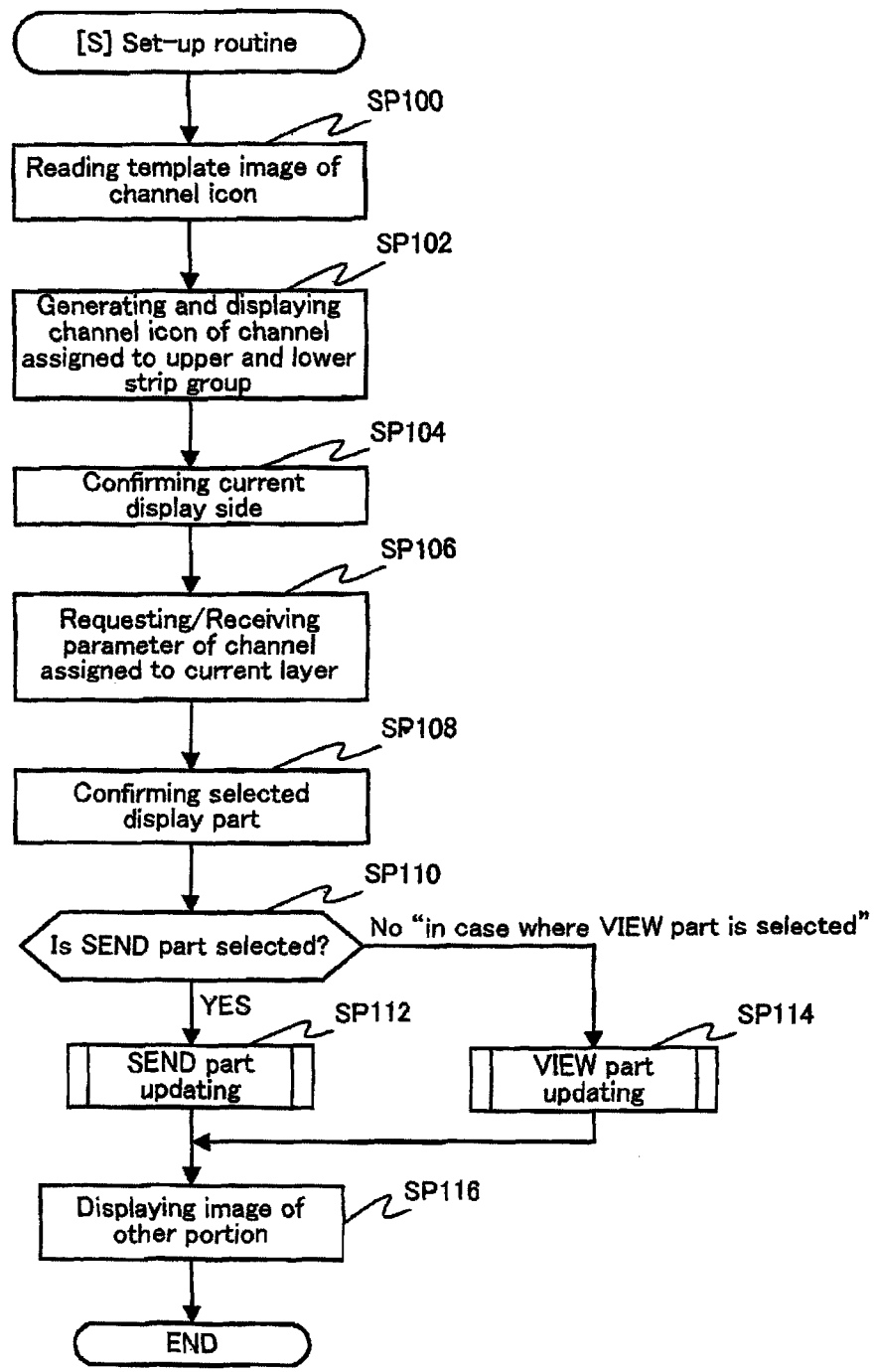
FIG. 13 is a flowchart of a set-up routine.

When the power source of the sub-console 1200 is turned on, or when a predetermined initialization process is executed, a set-up routine illustrated in FIG. 13 is started in the sub-console 1200. In FIG. 13, when the program proceeds to step SP100, the channel-icon template 1164 stored in the ROM area of the memory 1216 is read out, and transferred to the buffer area, used for editing an image, provided in the RAM area. When the program then proceeds to step SP102, the channels assigned to the respective channel strips are specified on the basis of the current layer information 1270 assigned to the upper and lower channel strip groups 42 and 40. Thus, the channel number and the channel name of each of these channels are specified. The character image representing the specified channel number and the channel name is combined with the template in the buffer area, whereby the image of the channel icon corresponding to each of the channel strips is produced, and each of the channel icons is displayed on the channel display areas 52*a*, 54, 52*c*, and 54*c* on the left and right displays. Specifically, even when the other image has already been displayed on the channel display areas 52*a*, 54, 52*c*, and 54*c*, this image is overwritten by the newly produced channel icon image.

When the program proceeds to step SP104, the current display side is confirmed on the basis of the current display-side information 1274 (see FIG. 10C) in the memory 1216. When the program proceeds to step SP106, a message, which demands to transfer the signal processing parameters involved with the upper and lower layers stored in the current layer information 1270, is transmitted from the sub-console 1200 to the main console 1100. When the signal processing parameters are transmitted from the main console 1100, these parameters are stored in the memory 1216. When the program proceeds to step SP108, the display part (VIEW part or any one of the SEND parts) currently selected is confirmed on the basis of the current display part information 1276 in the memory 1216.

When the program proceeds to step SP110, it is determined whether the currently selected part is the SEND part or not on the basis of the result of the confirmation at the step SP108. When "YES" determination is made, the program proceeds to step S112 where the above-mentioned SEND part updating sub-routine (FIG. 11C) is called out. The process of the present sub-routine is the same as the process in the main console 1100. However, the different point is that, at step SP92, the parameter display image is produced based upon the signal processing parameters of the respective channels assigned to the "current display side" (that is indicated by the current display side information 1274), and the SEND part image obtained by combining the parameter display image and the template is overwritten at the position (e.g., the position of the SEND part images 200-1 to 200-8 in FIGS. 8A and 8B) corresponding to the "current display side" in the parameter areas 52*b*, and 54*b*.

On the other hand, "NO" determination is made at step SP110 in the set-up routine, the program proceeds to step SP114 where the above-mentioned VIEW part updating sub-routine (FIG. 11D) is called out. The process of the present sub-routine is also the same as the process in the main console 1100. However, the different point is that, at step SP98, the parameter display image is produced based upon the signal processing parameters of the respective channels assigned to the "current display side", and the VIEW part image obtained by combining the parameter display image and the template 1162 (see FIG. 10B) is overwritten at the position corresponding to the "current display side" in the parameter areas 52*b*, and 54*b*. When the program proceeds to step SP116 in the set-up routine, the image at the portion other than the above-mentioned portions, e.g., the image (rectangular black image) at the non-display sections 338 and 340, is displayed (in other words, the non-display sections 338 and 340 that are the space where there is nothing to be displayed are formed), and then, the process of the present set-up routine is completed.

Figure 14A:
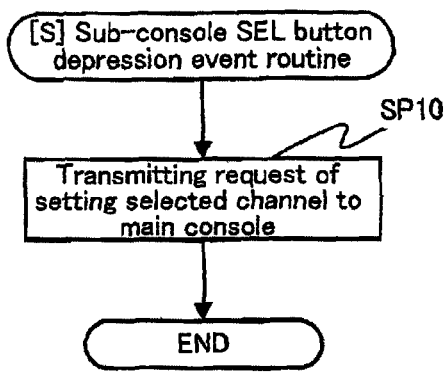
FIG. 14A is a flowchart of a sub-console SEL button depression event routine.
Figure 14B:
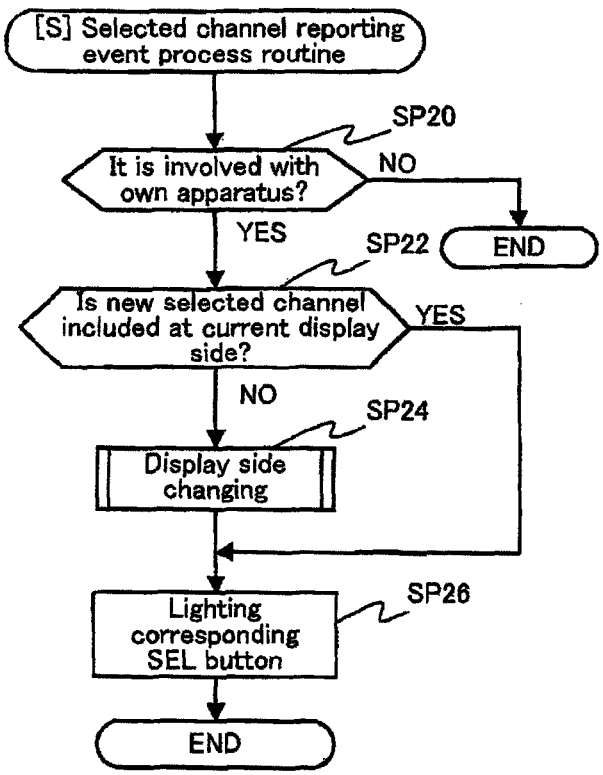
FIG. 14B is a flowchart of a selected channel reporting event process routine.

6.2.2 Event Process for Designating Selected Channel (FIGS. 14A and 14B)

When any one of the SEL buttons 10 is depressed in the upper and lower channel strip groups 42 and 40 on the sub-console 1200, a sub-console SEL button depression event routine illustrated in FIG. 14A is started in the CPU 1214 of the sub-console 1200. In FIG. 14A, when the process proceeds to step SP10, a selected channel designation request message, which demands to set the channel involved with the SEL button 10 (the input/output channel assigned to the channel strip to which the SEL button 10 belongs) as the selected channel, is transmitted to the main console 1100. The process of the present routine is completed.

Thereafter, on the main console 1100, the above-mentioned selected channel/parameter changing event process routine (FIG. 12C) is started. As a result, when the channel is set as the selected channel, a selected channel changing message that specifies a new selected channel is transmitted from the main console 1100 to the sub-console 1200. This message is transmitted to the sub-console 1200 not only in response to the step SP10 but also in case where the selected channel is changed as a result of the depression of any one of the SEL buttons 10 on the main console 1100 as described above.

When the message is received by the sub-console 1200, a selected channel reporting event process routine illustrated in FIG. 14B is started in the CPU 1214 of the sub-console 1200. When the program proceeds to step SP20 in FIG. 14B, it is determined whether the selected channel indicated by the received message is related to own console or not, i.e., whether any one of the channels assigned to the upper and lower channel strip groups 42 and 40 is set as the selected channel or not. When "NO" determination is made, the process of the present routine is completed without executing the substantial process.

On the other hand, when "YES" determination is made at the step SP20, the program proceeds to step SP22 where it is determined whether the channel assigned to the channel strip group involved with the current display side (upper side or lower side) includes the selected channel or not. When "YES" determination is made, the program proceeds to step SP26 where the SEL button 10 involved with the channel is lighted on, and the SEL buttons 10 involved with the other channels are lighted off. Then, the process of the present routine is completed. Therefore, the display contents on the left and right displays 52 and 53 are unchanged.

Figure 14C:
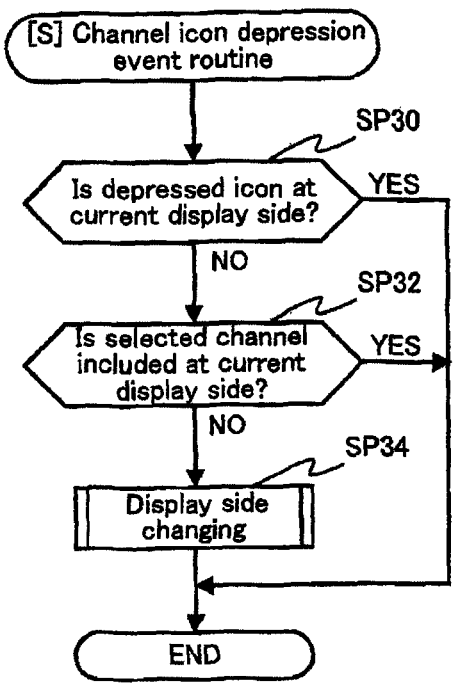
FIG. 14C is a flowchart of a channel icon depression event routine.
Figure 14D:
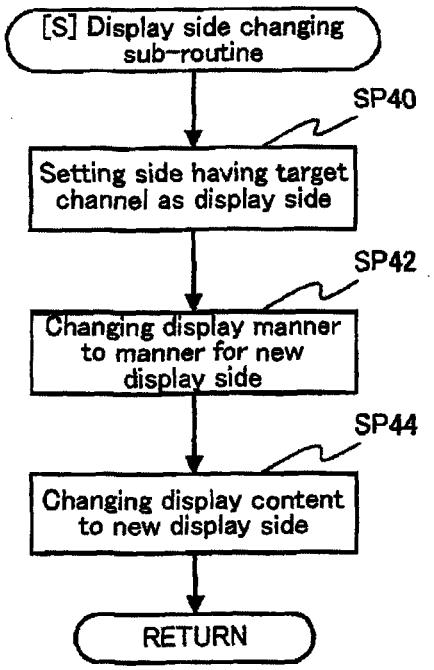
FIG. 14D is a flowchart of a display side changing subroutine.

On the other hand, when "NO" determination is made at the step SP22, a display side changing sub-routine illustrated in FIG. 14D is started. In FIG. 14D, when the program proceeds to step SP40, the side having the target channel (in this case, the selected channel) is set as the display side. Specifically, the current display side information 1274 (see FIG. 10C) is updated in such a manner that the side to which the target channel belongs becomes the current display side information 1274. When the program proceeds to step SP42, the display manner on the left and right displays 52 and 54 are set to be those for a new display side. For example, the positions of the SEND part images 200-1 to 200-8 are set at the side according to the display side in FIGS. 8A and 8B. Specifically, the parameter display images (in the above-mentioned example, the SEND part images 200-1 to 200-8) in the parameter areas 52*b* and 54*b* are made close to the opposite side. Specifically, of the upper and lower sides of the parameter areas 52*b* and 54*b*, the space between the current non-display side and the parameter display images is not formed, but the space between the current display side and the parameter display images is formed, whereby the parameter display images are newly made close to the display side so as to be associated with the new display side.

When the program proceeds to step SP44, the display contents on the left and right displays 52 and 54 are changed to the display contents according to the display side. In the example in FIGS. 8A and 8B, the display level at the send level display section in each of the SEND part images 200-1 to 200-8 is changed to agree with the send level at the new display side. In this way, at the step SP44, the content of the parameter display images is displayed on the basis of the parameter values at the side that is made close to, i.e., at the new display side. As a result, if the display manner before the parameter display images are made close to is as illustrated in FIG. 8A, this display manner is changed to that illustrated in FIG. 8B. On the contrary, if the display manner before the parameter display images are made close to is as illustrated in FIG. 8B, this display manner is changed to that illustrated in FIG. 8A. Thus, the process of the display side changing sub-routine (FIG. 14D) is completed. When the program returns to the routine in FIG. 14B, the SEL button 10 involved with the selected channel is lighted on at step SP26, and the process of the present routine is also completed.

According to the routines illustrated in FIGS. 14A and 14B, when the new selected channel related to the own console is designated, the side to which the new selected channel belongs is set as the display side. Since the selected channel is designated in order to make a detailed setting of the parameters, the demand to automatically display the parameters involved with the selected channel on the left and right displays 52 and 54 is considered to be very high. In the present embodiment, this operation can automatically be executed by the process described above. Therefore, a user does not need to change the display side by a manual operation, whereby a high operability can be realized. It is determined at the step SP22 whether the channel assigned to the channel strip group involved with the current display side includes the selected channel or not. This step is, in other words, "the process for determining whether or not there is a need to change the display side" or "the process for determining whether the new side is designated as the side where the parameters are displayed on the parameter areas 52*b* and 54*b*". When the SEL button 10 is supposed to be the operation of designating the display side, this step SP22 is "the process for detecting the designation of the display side".

6.2.3 Event Process for Channel Icon (FIG. 14C)

When any one of the channel icons is depressed on the left and right displays 52 and 54 on the sub-console 1200, a channel icon depression event routine illustrated in FIG. 14C is started. In FIG. 14C, when the program proceeds to step SP30, the current display side information is referred to so as to determine whether the depressed icon is the one at the display side or not. For example, the channel icons 302-1 to 302-8 are the icons at the current display side in FIG. 8A, while the channel icons 304-1 to 304-9 are the icons at the current display side in FIG. 8B. When "YES" determination is made, the process of the present routine is completed without executing the substantial process. This is because there is no need to change the display side in this operation.

On the other hand, when "NO" determination is made at the step SP30, the program proceeds to step SP32 where it is determined whether the channel involved with the current display side includes the selected channel or not. When "YES" determination is made, the process of the present routine is completed without executing the substantial process. On the other hand, when "NO" determination is made at the step SP32 (i.e., when the channel icon at the side reverse to the current display side is depressed, and the channel involved with the current display side does not include the selected channel), the program proceeds to step SP34 where the above-mentioned display side changing sub-routine (FIG. 14D) is called out. It is to be noted that the "target channel" in FIG. 14D is the channel whose corresponding channel icon is depressed in this case. Since the present sub-routine is called out, the current display side information 1274 is changed to the side reverse to the current side (SP40, 42), and the display content is changed to the one according to the new display side (SP44).

In this way, according to the routine in FIG. 14C, when the selected channel is included in the channel involved with the current display side, the display side is not changed even if any one of the channel icons is depressed, whereby the side to which the selected channel belongs is always set as the display side. As described above, the selected channel is designated in order to make a detailed setting of the parameters. Therefore, the demand to keep on displaying the parameters involved with the selected channel on the left and right displays 52 and 54 is considered to be very high. Even if the channel icon at the reverse side is depressed, this operation highly possibly erroneous. Therefore, the present routine can prevent, as much as possible, the situation in which the display side is changed by the erroneous operation, whereby the high operability can be realized. At the steps SP30 and SP32, it is determined whether "the depressed icon is at the current display side or not" and whether "the selected channel is included at the current display side", respectively. Summing up both determinations, the step SP 30 and the step SP32 are "the process for determining whether there is a need to change the display side or not" or "the process for determining whether the new side is designated as the side where the parameters are displayed on the parameter areas 52b and 54b". When the depression of the channel icon is supposed to be the operation of designating the display side, this step SP22 is "the process for detecting the designation of the display side".

Figure 15:
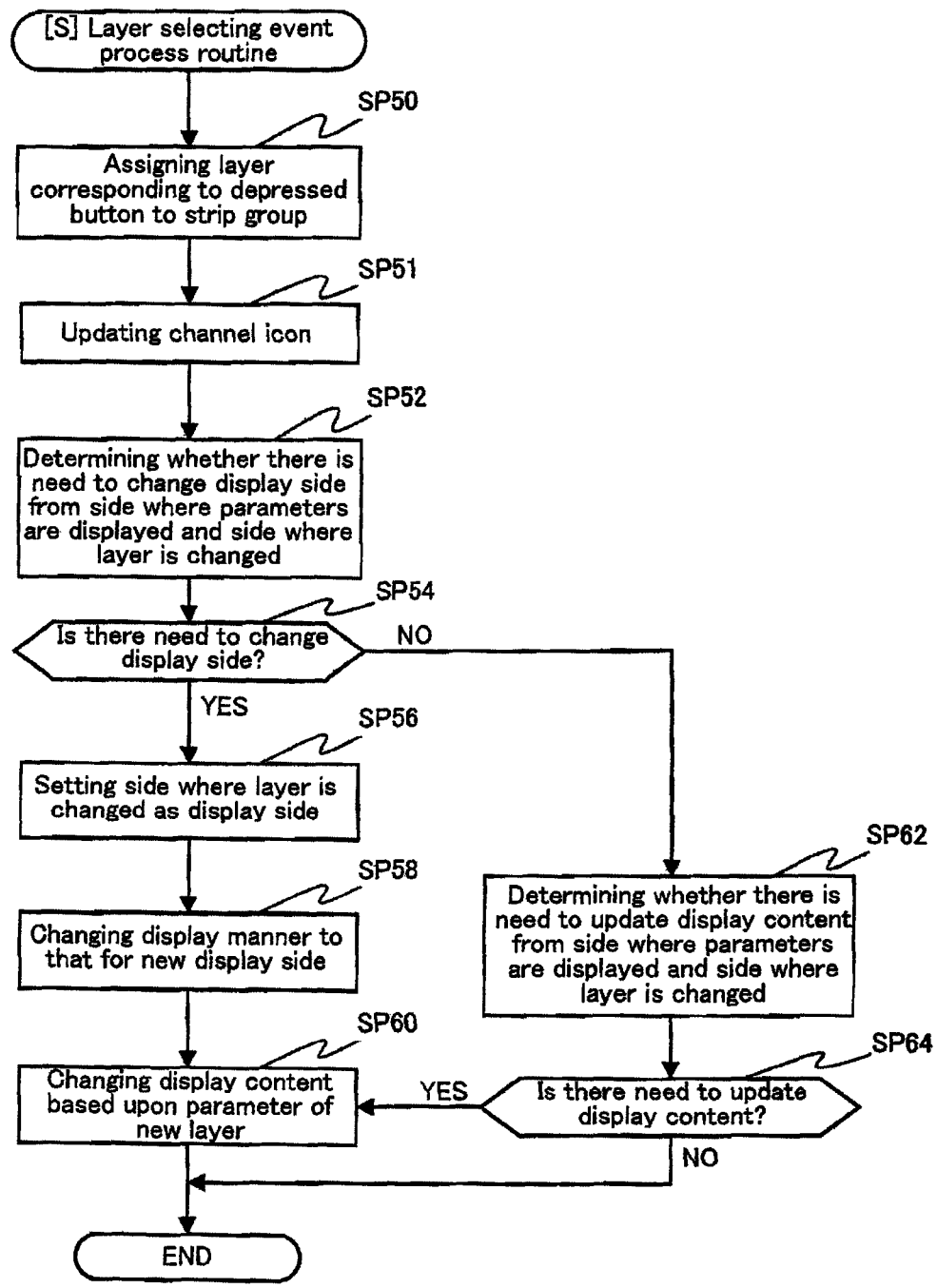
FIG. 15 is a flowchart of a layer selecting event process routine.

6.2.4 Layer Selecting Event Process (FIG. 15)

When the effective button of the layer type selecting buttons 22, 24, and 26 or the layer number selecting buttons 28-1 to 28-8 in the layer selecting sections 44 and 46 is depressed on the sub-console 1200, a layer selecting event process routine illustrated in FIG. 15 is started. In FIG. 15, when the program proceeds to step SP50, the layer corresponding to the depressed button is assigned to the upper channel strip group 40 or the lower channel strip group 42. Specifically, the information, of the current layer information 1270 (see FIG. 10C), at the side where the layer is selected is updated to indicate the newly selected layer. The side where the layer is selected is referred to as "layer-changing side" below. Specifically, when the lower layer selecting section 44 is operated, the layer-changing side is the "lower side", so that the corresponding layer is assigned to the lower channel strip group 40. On the other hand, when the upper layer selecting section 46 is operated, the layer-changing side is the "upper side", so that the corresponding layer is assigned to the upper channel strip group 42.

The process executed at the step SP50 will be described in more detail. The sub-console 1200 only stores the signal processing parameter of the layer currently assigned to the upper and lower channel strip groups 42 and 40. Therefore, it does not store the signal processing parameter of the newly selected layer (hereinafter referred to as a new layer) in general. Accordingly, a request message for transmitting the parameter together with the current layer information 1270 is outputted to the main console 1100 from the sub-console 1200, and the signal processing parameter of the new layer is replied from the main console 1100 to the sub-console 1200. In this case, the sub-console assignment information 1172 involved with the sub-console is updated so as to agree with the received current layer information 1270 on the main console 1100.

In the upper channel strip group 40 or the lower channel strip group 42 to which the new layer is assigned, each of the electric faders 2 (see FIG. 7) is automatically driven on the basis of the replied signal processing parameter, whereby the operation amounts thereof are changed, and the display content on the character display device 4, light-on/light-off state of the buttons 6, 8, 10, and 12, and light-on/light-off state of the LED group 14a around the knob 14 are changed. When the program proceeds to step SP51, the channel icon at the layer-changing side in the channel display areas 52a, 54a, 52c, and 54c is updated. Specifically, when the layer-changing side is the upper side, the icons in the upper channel display areas 52a and 54a are updated, while when the layer-changing side is the lower side, the icons in the lower channel display areas 52c and 54c are updated. The process at the step SP51 is the same as the processes at the steps SP100 and SP102 in the set-up routine (FIG. 13).

When the program proceeds to step SP52, it is determined based upon the reference described below whether there is a need to change the display side on the basis of the current display side indicated by the current display side information 1274 (see FIG. 10C) and the layer-changing side.

(Reference 1-1) When the current display side and the layer-changing side are equal to each other (i.e., when both sides are the upper side or lower side), the changeover of the display side is not performed.

(Reference 1-2) When the current non-display side is the layer-changing side, and the new layer includes the selected channel, the current non-display side is changed to the display side. When the new layer does not include the selected channel, the changeover of the display side is not performed.

It is understood from the references 1-1 and 1-2 that, when the selected channel is included in either one of the upper and lower sides, the side to which the selected channel belongs is held as the display side, regardless of the layer-changing side. On the other hand, when the selected channel is not included in either one of the upper side and the lower side, the changeover of the display side is not performed because of the layer change. When the same layer is assigned to the upper and lower sides, and the selected channel is included in the same layer, the display side is changed.

As described above, when the selected channel is included in the upper or the lower side, the demand for keep on displaying the parameters involved with the selected channel on the left and right displays 52 and 54 is very high. According to the present embodiment, when the selected channel is included in the upper or the lower layer, the display side is selected so as to always display the parameters of the selected channel, according to the references 1-1 and 1-2. Thus, a user does not need to select the display side by a manual operation, whereby high operability can be realized.

When the program proceeds to step SP54, it is determined whether the determination that there is a need to change the display side is made or not at the step SP52. The steps SP52 and SP54 are, in other words, "the process for determining whether the new side is designated as the side where the parameters are displayed on the parameter areas 52b and 54b". When the operation at the layer selecting sections 44 and 46 is supposed to be the operation of designating the display side, these steps SP52 and SP54 are "the process for detecting the designation of the display side". When "YES" determination is made at step SP54, the program proceeds to step SP56 where the current display side information 1274 is updated so as to set the layer-changing side as the display side. When the program proceeds to step SP58, the display manner in the parameter areas 52b and 54b is set to that for the new display side. For example, the positions of the SEND part images 200-1 to 200-8 are set at the side according to the display side in the example of FIGS. 8A and 8B. When the program proceeds to step SP60, the display content in the parameter areas 52b and 54b is changed to that according to the display side. For example, the display level of the send level display section in each of the SEND part images 200-1 to 200-8 is changed so as to agree with the send level at the new display side.

On the other hand, when the changeover of the display side is unnecessary, the program proceeds to step SP62 through the step SP54. At step SP62, it is determined whether the parameter areas 52*b* and 54*b* have to be updated or not on the basis of the current display side information 1274 and the layer-changing side. Specifically, it is determined that the display content has to be updated when the display side and the layer-changing side are equal to each other (when both are the upper side or both are the lower side). When the program proceeds to step SP64, it is determined whether the determination that the display content has to be updated or not is made or not at the step SP62. When "YES" determination is made, the step SP60 is executed, whereby the display content in the parameter areas 52*b* and 54*b* is changed to that according to the display side. When "NO" determination is made at the step SP54 and the step SP60 is executed through the steps SP62 and SP64, the display side is not changed, and only the display content in the parameter areas 52*b* and 54*b* is changed on the basis of the parameter of the layer newly assigned in the prior display side. On the other hand, when "NO" determination is made at the step SP64, the present routine is completed.

Figure 16:
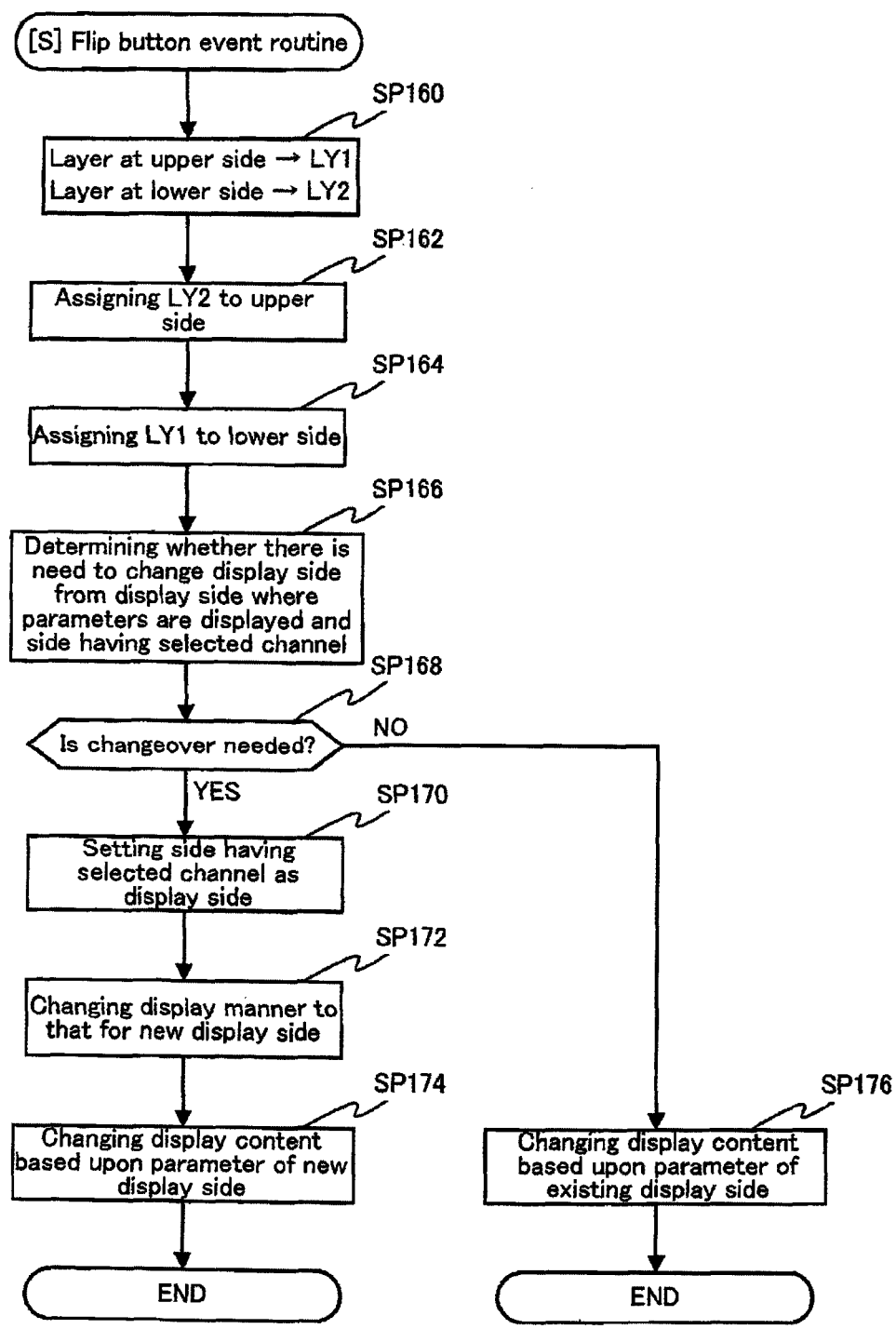
FIG. 16 is a flowchart of a flip button event routine.

6.2.5 Event Process of Flip Button 30 (FIG. 16)

When the flip button 30 is depressed at the lower layer selecting section 44 (see FIG. 7) on the sub-console 1200, a flip button event routine illustrated in FIG. 16 is started. In FIG. 16, when the program proceeds to step SP160, a value (value specifying the layer) indicating the layer assigned to the upper channel strip group 42 is written in a variable LY1, and a value indicating the layer assigned to the lower channel strip group 40 is written in a variable LY2. When the program proceeds to step SP162, the layer indicated by the variable LY2 is assigned to the upper channel strip group 42. When the program proceeds to step SP164, the layer indicated by the variable LY1 is assigned to the lower channel strip group 40.

When the program proceeds to step SP166, it is determined based upon the reference described below whether there is a need to change the display side on the basis of whether either one of the current display side and the layer assigned to the upper side or the lower side includes the selected channel or not.

(Reference 2-1) When any one of the channels involved with the upper and lower channel strip groups 42 and 40 is the selected channel, the changeover of the display side is needed.

(Reference 2-2) When any one of the channels involved with the upper and lower channel strip groups 42 and 40 does not include the selected channel, the changeover of the display side is not performed.

If any one of the channels involved with the upper and lower channel strip groups 42 and 40 is the selected channel as described above, the side to which the selected channel belongs is always set as the display side. When the flip button 30 is depressed with this state, the side to which the selected channel belongs is changed to the reverse side. In this case, the changeover of the display side is performed according to the reference 2-1, so that the side to which the selected channel belongs is always set to the display side even after the flip button 30 is depressed.

When the selected channel is included in the layer of the upper side or the lower side, the demand to keep on displaying the parameters involved with the selected channel on the left and right displays 52 and 54 is very high as described above. Therefore, in the present embodiment, even when the flip button 30 is depressed, the display side is selected in order that the parameters of the selected channel are always displayed. Thus, a user does not need to select the display side by a manual operation, whereby high operability can be realized.

When the program proceeds to step SP168, it is determined whether the determination that there is a need to change the display side is made or not at the step SP166. The steps SP166 and SP168 are, in other words, "the process for determining whether the new side is designated as the side where the parameters are displayed on the parameter areas 52*b* and 54*b*". When the depression of the flip button 30 is supposed to be the operation of designating the display side, these steps S166 and SP168 are "the process for detecting the designation of the display side". When "YES" determination is made at step SP168, the processes at steps SP170 to SP174 are executed. These processes are the same as those at the steps SP56 to SP60 in the layer selecting event process routine (FIG. 15). By these processes, the current display information 1274 is updated, and the contents on the parameter areas 52*b* and 54*b* are updated based upon the signal processing parameter on the new display side.

On the other hand, when the changeover of the display side is unnecessary, the program proceeds to step SP176 through the step SP168. At step SP176, the display contents on the parameter areas 52*b* and 54*b* are changed on the basis of the signal processing parameter involved with the layer assigned to the current display side (the layer assigned to the display side at the step SP162 or SP164). At the step SP176, the display side is not changed, and only the display content in the parameter areas 52*b* and 54*b* is changed on the basis of the parameter of the layer newly assigned in the prior display side. Thus, the present routine is completed.

Figure 17A:
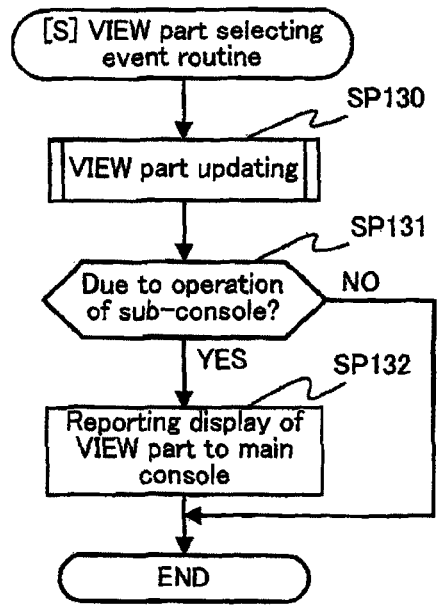
FIG. 17A is a flowchart of a VIEW part selecting event routine.
Figure 17B:
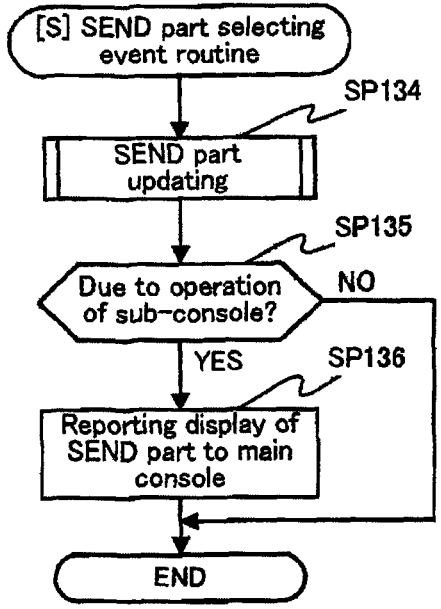
FIG. 17B is a flowchart of a SEND part selecting event routine.

2.6.2 Event Process of VIEW/SEND Part Selection (FIGS. 17A, 17B)

When the VIEW button 66 is depressed on the sub-console 1200, a VIEW part selecting event routine illustrated in FIG. 17A is started. This routine is also started when a part selecting message (FIG. 12A, step SP125) indicating that the VIEW part has to be selected is received from the main console 1100. In FIG. 17A, when the program proceeds to step SP130, the above-mentioned VIEW part updating subroutine (FIG. 11D) is called out, whereby the VIEW part image is displayed on the parameter areas 52*b* and 54*b* on the sub-console 1200. Simultaneously, the current display part information 1276 (see FIG. 10C) is updated so as to indicate the VIEW part.

When the program proceeds to step SP131, it is determined whether the VIEW part selecting event routine is started or not due to the operation (the depression of the VIEW button 66) on the sub-console 1200. When "YES" determination is made, the program proceeds to step SP132 where the part selecting message indicating that the VIEW part is selected is transmitted to the main console 1100. Then, the process of the present routine is completed. On the other hand, when the VIEW part selecting event routine is started based upon the part selecting message from the main console 1100, "NO" determination is made at the step SP131, so that the step SP132 is skipped. Then, the process of the present routine is completed. When the step SP132 is executed, the above-mentioned part selecting message receiving event routine (FIG. 12A) is executed on the main console 1100. As a result, the lower display part information 1176 on the main console 1100 and the current display part information 1276 on the sub-console 1200 both indicate the VIEW part.

When the SEND button 68 is depressed on the sub-console 1200, a SEND part selecting event routine illustrated in FIG. 17B is started. This routine is also started when the part selecting message (step SP125 in FIG. 12A) indicating that the SEND part should be selected is received from the main console 1100. When the program proceeds to step SP134 in FIG. 17B, the above-mentioned SEND part updating subroutine (FIG. 11C) is called out, whereby the SEND part image is displayed on the parameter areas 52b and 54b of the sub-console 1200. Simultaneously, the current display part information 1276 (see FIG. 10C) is updated so as to indicate the SEND part.

When the program proceeds to step SP135, it is determined whether the SEND part selecting event routine is started or not due to the operation (the depression of the SEND button 68) on the sub-console 1200. When "YES" determination is made, the program proceeds to step SP136 where the part selecting message indicating that the SEND part is selected is transmitted to the main console 1100. Then, the process of the present routine is completed. On the other hand, when the SEND part selecting event routine is started based upon the part selecting message from the main console 1100, "NO" determination is made at the step SP135, so that the step SP136 is skipped. Then, the process of the present routine is completed. When the step SP136 is executed, the above-mentioned part selecting message receiving event routine (FIG. 12A) is executed on the main console 1100, as in the case of the VIEW part.

As a result, the lower display part information 1176 on the main console 1100 and the current display part information 1276 on the sub-console 1200 both indicate the SEND part. The overall operation when the VIEW button 66 is depressed on one sub-console 1200 will be described, in case where plural sub-consoles 1200 are connected to the main console 1100. On the sub-console, the VIEW part image is displayed on the parameter areas 52b and 54b through the execution of the step SP130. This operation is caused by "the depression of the VIEW button 66". Therefore, the step SP132 is executed, and the part selecting message indicating that the VIEW part is selected is transmitted to the main console 1100.

On the main console 1100, the part selecting message receiving event routine (FIG. 12A) is stated, wherein the display content on the parameter areas 82c and 84c is updated (step SP124) so as to position the VIEW part image at the lower side, and the part selecting message indicating to select the VIEW part is transmitted to the other sub-consoles 1200 (step SP125). As a result, the VIEW part selecting event routine (FIG. 17A) is also started on the other sub-consoles 1200, whereby the VIEW part image is displayed on the parameter areas 52b and 54b through the execution of the step SP130. Consequently, the lower display part information 1176 on the main console 1100 and the current display part information 1276 (see FIG. 10C) on all of the plural sub-consoles 1200 indicate the VIEW part, whereby the parts (the part displayed at the lower side on the main console 1100) displayed on these sub-consoles become the VIEW parts.

As described in FIG. 5, as viewed from plane when the main console 1100 and the sub-console 1200 are arranged side by side in the lateral direction, the lower side (front end) of the left and right main displays 82 and 84 of the main console 1100 are aligned to the lower side (front end) of the left and right displays 52 and 54 of the sub-console 1200. In this case, the height (the length in the front-to-rear direction) of the channel display areas 82e and 84e on the main console 1100 and the height (the length in the front-to-rear direction) of the lower channel display areas 52c and 54c on the sub-console 1200 substantially agree with each other. Therefore, the lower side of the parameter areas 82c and 84c and the lower side of the parameter areas 52b and 54b are substantially aligned to each other.

When the VIEW part is selected on the sub-console 1200, the VIEW part image is also displayed at the lower side of the left and right main displays 82 and 84 on the main console 1100. Therefore, the VIEW part images are displayed so as to be aligned on a straight line in the lateral direction on all consoles 1100 and 1200 as illustrated in FIG. 18A. The SEND part image is simultaneously arranged above the VIEW part image side by side on the left and right main displays 82 and 84 of the main console 1100. On the other hand, the SEND part image is not displayed on the left and right displays 52 and 54 on the sub-console 1200. Similarly, when the SEND part is selected on the sub-console 1200, the SEND part image is also displayed at the lower side of the left and right main displays 82 and 84 of the main console 1100. Therefore, the SEND part images are displayed so as to be aligned on a straight line in the lateral direction on all consoles 1100 and 1200 as illustrated in FIG. 18B.

The VIEW part image is simultaneously arranged above the SEND part image side by side on the left and right main displays 82 and 84 of the main console 1100. On the other hand, the VIEW part image is not displayed on the left and right displays 52 and 54 on the sub-console 1200. As illustrated in FIGS. 18A and 18B, the height of the left and right displays 52 and 54 of the sub-console 1200 is lower than the left and right main displays 82 and 84 of the main console 1100, wherein only the selected one of the VIEW part image and the SEND part image is displayed. On the other hand, the left and right main displays 82 and 84 of the main console 1100 have a size (height) that can simultaneously display the VIEW part image and the SEND part image, so that the VIEW part image and the SEND part image are simultaneously displayed side by side in the front-to-rear direction.

As described above, one of the VIEW part image and the SEND part image is selected to be displayed on the left and right displays 52 and 54 on the sub-console 1200 according to the present embodiment. Therefore, the left and right displays 52 and 54 can be configured to have the height (the length in the front-to-rear direction) lower than the left and right main displays 82 and 84 of the main console 1100. Thus, although the depth of the sub-console 1200 is equal to that of the main console 1100, the channel strip groups 40 and 42 that is twice as many as the number of the channel strip groups of the main console 1100 can be arranged along the front-to-rear direction, whereby a great number of channel strips can efficiently be arranged in a narrow space.

Since the display part at the lower part of each display of the consoles 1100 and 1200 are aligned to each other as illustrated in FIGS. 18A and 18B, the display contents of the consoles 1100 and 1200 have uniformity. Since the width of each of the channel strips 40-1 to 40-16 and 42-1 to 42-16 on the sub-console 1200 in the lateral direction is equal to the width of each of the channel strips 70-1 to 70-16 on the main console 1100, and the arrangement of the operation devices in the channel strip is also equal to each other as described above, the commonality between the main console 1100 and the sub-console 1200 can be secured from both aspects of operation and visual confirmation. Accordingly high operability can be realized.

Figure 17C:
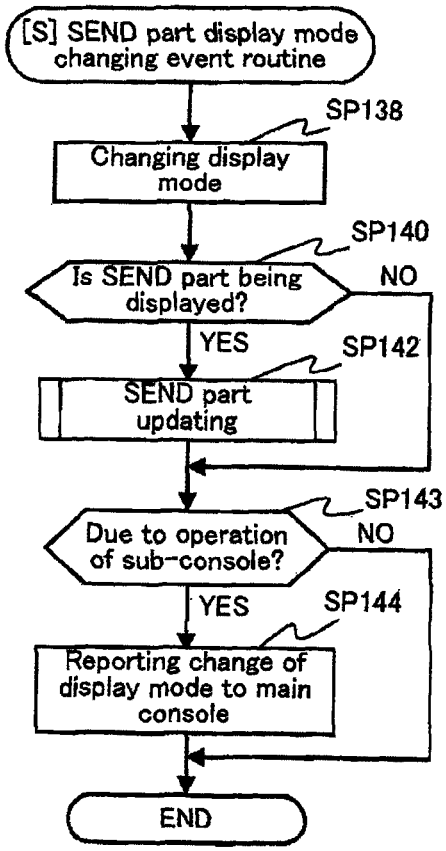
FIG. 17C is a flowchart of a SEND part display mode changing event routine.

6.2.7 Display Mode Changing Event Process of SEND Part (FIG. 17C)

When the display mode of the SEND part is changed on the sub-console 1200, i.e., when any one of the button images 262 to 272 is depressed on the MENU image 260 (see FIG. 9E), a SEND part display mode changing event routine illustrated in FIG. 17C is started. This routine is also started when the display mode change instruction message (see step SP129 in FIG. 12B) is transmitted from the main console 1100 to the sub-console 1200. When the program proceeds to step SP138 in FIG. 17C, a newly designated display mode is set to the current display mode information 1278. When the program then proceeds to step SP140, it is determined whether the SEND part image is currently displayed or not on the parameter areas 52b and 54b.

When "YES" determination is made at step SP140, the program proceeds to step SP142. At the step SP142, the SEND part updating sub-routine (FIG. 11C) is called out so as to display the SEND part image involved with the new display mode, whereby the SEND part image of the display mode is displayed on the parameter areas 52b and 54b on the sub-console 1200. When the SEND part image is not displayed (i.e., when the VIEW part image is displayed), the step SP142 is skipped. When the program proceeds to step SP143, it is determined whether the SEND part display mode changing event routine is started due to the operation (the operation on the MENU image 260) on the sub-console 1200. When "YES" determination is made, the program proceeds to step SP144 where a message reporting the new display mode is transmitted to the main console 1100. Since the current display mode information 1178 is updated according to the message on the main console 1100 as described above, the current display mode information 1178 on the main console 1100 and the current display mode information 1278 on the sub-console 1200 agree with each other. On the other hand, when "NO" determination is made at the step SP143, the step SP144 is skipped, and then, the process of the present routine is completed.

Figure 17D:
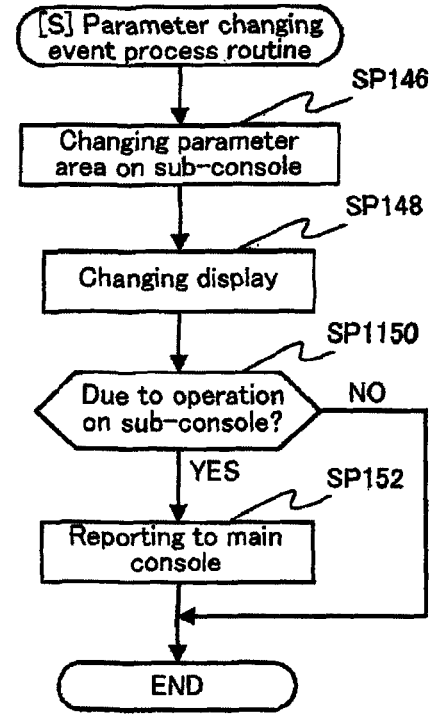
FIG. 17D is a flowchart of a parameter changing event process routine.

6.2.8 Event Process for Parameter Operation and Notification (FIG. 17D)

When the operation devices corresponding to the signal processing parameter, such as the electric fader 2, the CUE button 6, the on/off button 12, the knobs 14 and 18, and the like, are operated on the sub-console 1200, a parameter changing event process routine illustrated in FIG. 17D is started. This routine is also started when the parameter changing message (step SP186 in FIG. 12C) is transmitted from the main console 1100. When the program proceeds to step SP146 in FIG. 17D, the parameter 1252 (see FIG. 10A) is changed on the basis of the operation amount of the operation device or the content of the parameter changing message. When the program proceeds to step SP148, the display content on the parameter areas 52b and 54b or the display state of the upper and lower channel strip groups 42 and 40 is changed according to the result of the change in the parameter.

When the program proceeds to step SP50, it is determined whether the parameter changing event process routine (FIG. 17D) is started or not due to the operation (the operation of the upper and lower channel strip groups 42 and 40) on the sub-console 1200. When "YES" determination is made, the program proceeds to step SP152 where the parameter changing message indicating the changed content of the signal processing parameter is reported to the main console 1100. On the other hand, when "NO" determination is made at the step SP150, the step SP152 is skipped, and the process of the present routine is completed.

7. Modifications

The present invention is not limited to the above-mentioned embodiment, but various modifications described below are possible.

7.1 Modification as to Mechanical Structure (1) Although the angle θ1 made by the front panel 1202 of the sub-console 1200 and the installation surface is "0°" in the embodiments described above, θ1 may assume the value other than "0°". Specifically, the front panel 1202 may be slightly tilted. The angle θ3 of the rear panel 1206 is selected so as to establish the inequality of "θ1<θ3", the inequality of "θ1≧θ3" may be established. Specifically, the angles θ1, θ2, and θ3 may appropriately be changed, so long as the relationship of "θ1<θ2" and the relationship of "θ3<θ2" are maintained. The front panel 1202, the middle panel 1204, and the rear panel 1206 may be arranged on the same plane. The number of the channel strips of the upper and lower channel strips groups 42 and 40 is different from each other.

(2) In the above-mentioned embodiment, the devices such as the consoles 1100 and 1200, the engine 1300, the microphone controller 1400, the amplifier controller 1500, and the other sound device 1600, are housed in a different casing, and these devices are connected by the IP network 1000. However, all of or some of these devices may be housed in the same casing.

7.2 Modification (1) in Depression Event of SEL Button on Sub-Console 1200

In the above-mentioned embodiment, when any one of the SEL buttons 10 is depressed on the sub-console 1200, the selected channel designation request message is transmitted to the main console 1100 (step SP10 in FIG. 14A), and the reception of the selected channel changing message causes the execution of the process such as the changeover of the display side (steps SP24 and 26 in FIG. 14B). However, the processes at the steps SP24 and SP26 may immediately be executed without waiting the response from the main console 1100, when any one of the SEL buttons 10 is depressed on the sub-console 1200.

(2) In the above-mentioned embodiment, the process for changing the display side is executed when the selected channel changing message is transmitted from the main console 1100 to the sub-console 1200. However, the display side is not always necessarily changed according to the selected channel on the sub-console 1200. Specifically, the selected channel may be neglected upon determining the display side.

7.3 Modification of Display Manner According to Display Side of Left and Right Displays 52 and 54

(1) The above-mentioned embodiment has a feature that the display manner is changed according to the current display side in order that it can easily be recognized with which one of the upper channel strip group 42 and the lower channel strip group 40 the parameters displayed on the parameter areas 52b and 54b in the left and right displays 52 and 54 of the sub-console 1200 are involved, as described in FIGS. 8A and 8B. In order to realize this feature, various display manners can be employed other than the display manner described in the embodiment. For example, in the embodiment above, the upper and lower channel display areas 52a, 54a, 52c, and 54c are secured on the left and right displays 52 and 54 of the sub-console 1200, and the channel name and the channel number involved with the upper and lower channel strip groups 42 and 40 are displayed. However, only one of the channel name and the channel number may be displayed. Further, the channel display areas 52a, 54a, 52c, and 54c are omitted, and the whole left and right displays 52 and 54 can be used as the parameter areas 52b and 54b. One example of this structure will be described in FIG. 19A.

Figure 19A:
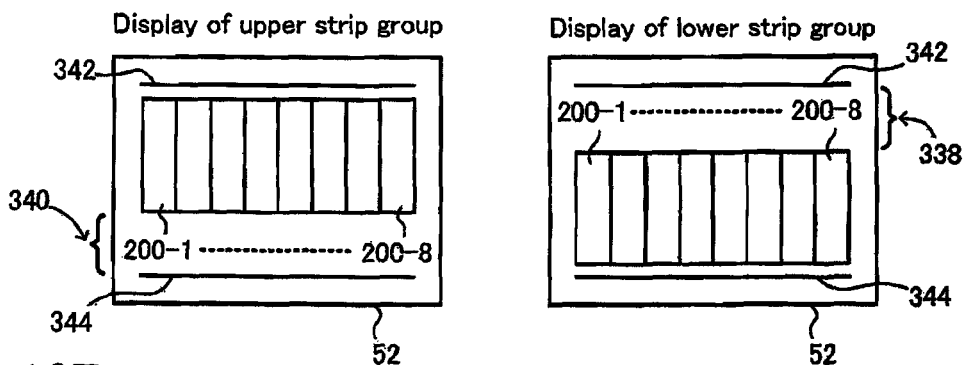
FIG. 19A is a view illustrating a display example on the left display according to a modification.

In FIG. 19A, guide lines 342 and 344 extending in the lateral direction are displayed respectively at the upper end and the lower end of the left display 52. The non-display sections 338 and 340 are formed between the guide lines 342 and 344 and the SEND part images 200-1 to 200-8. In this example, a user can immediately recognize which is the display side, upper side or the lower side, based upon which one of the guide lines 342 and 344 the SEND part images 200-1 to 200-8 are in close proximate to for display.

Figure 19B:
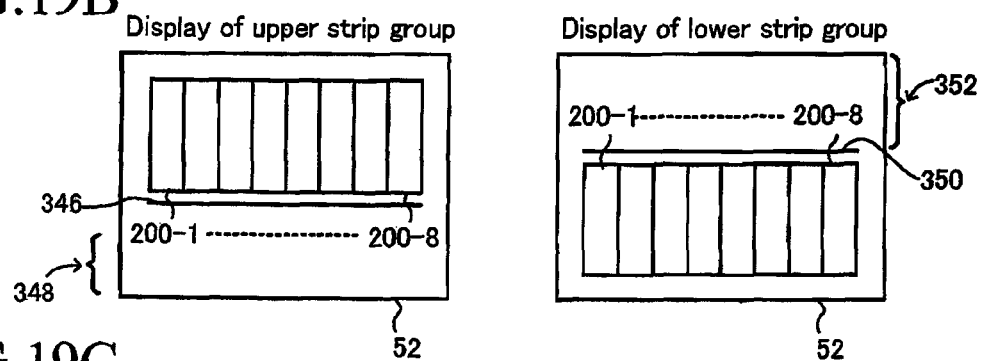
FIG. 19B is a view illustrating a display example on the left display according to another modification.

(2) In the example of FIG. 19A, the display positions of the guide lines 342 and 344 are fixed in spite of the display side. However, the guide lines can be displayed at the different position according to the display side. One example of this structure will be illustrated in FIG. 19B. In FIG. 19B, when the display side is the upper side, the SEND part images 200-1 to 200-8 are displayed in proximate to the upper end of the left display 52, wherein the guide line 346 extending in the lateral direction is displayed below the SEND part images 200-1 to 200-8, and the non-display section 348 is formed below the guide line 346. When the display side is the lower side in FIG. 19B, the SEND part images 200-1 to 200-8 are displayed in proximate to the lower end of the left display 52, wherein the guide line 350 extending in the lateral direction is displayed above the SEND part images 200-1 to 200-8, and the non-display section 352 is formed above the guide line 350. In this example, a user can immediately recognize which is the display side, upper side or the lower side, based upon whether the SEND part images 200-1 to 200-8 are located above or below the displayed guide lines 346 or 350.

Figure 19C:
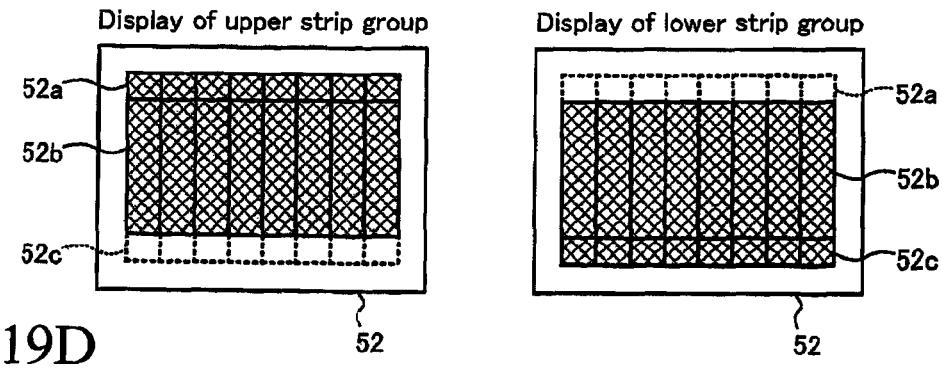
FIG. 19C is a view illustrating a display example on the left display according to another modification.

(3) The display side can be represented in a grayout manner on a part of the display screen. FIG. 19C illustrates one example of this structure. In FIG. 19C, the meshed portion is displayed by a normal display color, while the other portion is displayed in a grayout manner. When the display side is the upper side in FIG. 19C, the upper channel display area 52a is displayed by a normal display color, while the lower channel display area 52c is displayed in the grayout manner. When the display side is the lower side in FIG. 19C, the lower channel display area 52c is displayed by the normal display color, while the upper channel display area 52a is displayed in the grayout manner. Since the side displayed by the normal display color is the display side in this example, a user can immediately recognize which is the display side, upper side or the lower side.

Figure 19D:
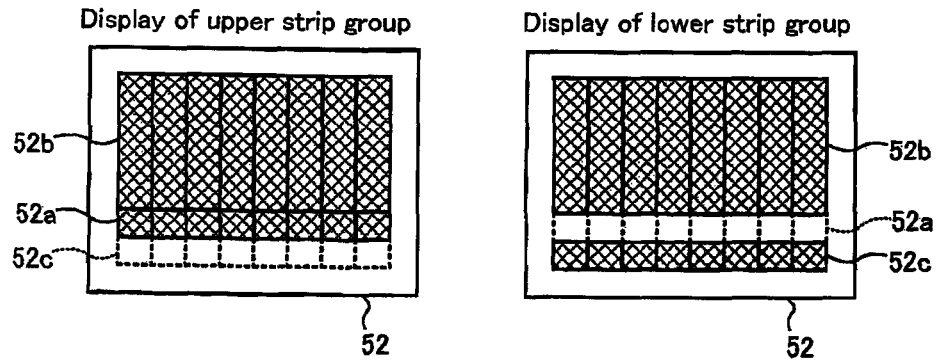
FIG. 19D is a view illustrating a display example on the left display according to another modification.

(4) In the modification in FIG. 19C, the upper channel display area 52a, the parameter area 52b and the lower channel display area 52c are secured in this order from the top to the bottom of the left display 52 as in the embodiment (FIG. 8). However, if one of the channel display areas 52a and 52c involved with the display side is displayed by the normal display color, and the other area is displayed in the grayout manner, the positions of the areas 52a, 52b, and 52c may be different from one another. FIG. 19D illustrates one example of this structure. In FIG. 19D, the meshed portion is displayed by the normal display color, while the other portion is displayed in the grayout manner. When the display side is the upper side in FIG. 19D, the upper channel display area 52a is displayed by the normal display color, while the lower channel display area 52c is displayed in the grayout manner, as in FIG. 19C. When the display side is the lower side in FIG. 19D, the lower channel display area 52c is displayed by the normal display color, while the upper channel display area 52a is displayed in the grayout manner. Accordingly, like the case of FIG. 19C, a user can immediately recognize which is the display side, upper side or the lower side.

The embodiment (FIG. 8) and the modifications illustrated in FIGS. 19A to 19D have the common feature. Specifically, the embodiment and the modifications have "a first area whose outer edge is rectangle" and "a second area that is located at the side lower than the first area, that is not overlapped with the first area, and that has a rectangle outer edge" in the display screen of the left display 52, wherein the first area is painted over with a first color when the display side is the lower side, and the second area is painted over with a second color when the display side is the upper side. In the embodiment (FIG. 8) and the modifications (FIGS. 19A and 19B), the non-display sections 338 and 352 are "the first area", while the non-display sections 340 and 348 is "the second area", wherein the first color and the second color are both "black". In other words, these non-display sections 338, 340, 348, and 352 are the space where nothing is displayed. Specifically, one example of forming "the space where nothing is displayed" is "displaying the rectangle black image".

In the modifications in FIGS. 19C and 19D, the section of the upper channel display area 52a other than the "characters" representing the channel number and the channel name is "the first area", and similarly, the section of the lower channel display area 52c other than the "characters" representing the channel number and the channel name is "the second area", wherein the first color and the second color are both "gray". Specifically, in the modifications in FIGS. 19C and 19D, the whole channel display area 52a or 52c is not painted over with gray having the same brightness, but the section constituting the "characters" representing the channel number and the channel name has a brightness slightly different from that of the other section, whereby these characters can be read. However, the color of the background of the characters is the same, and the outer edges of the first and second areas always become "rectangle" with a predetermined size, regardless of the content of the characters. Although the first and the second colors are the same in the embodiment (FIG. 8) and the modifications in FIGS. 19A and 19B, these colors may be different from each other.

7.4 Modification of Display Manner According to Positional Relationship Between Left and Right Displays 52, 54

In the embodiment described above, the parameter areas 52b and 54b of the sub-console 1200 and the parameter areas 82c and 84c of the main console 1100 are arranged in such a manner that the lower sides of these areas are aligned. However, these areas may be arranged in such a manner that the upper sides thereof may be aligned. In this case, the display part, of the VIEW part and the SEND part, selected on the sub-console 1200 may be displayed at the upper side.

The part, of the VIEW part and the SEND part displayed on the main console 1100, same as the display part on the sub-console 1200 is not necessarily aligned to the display part on the sub-console 1200. The display position of the VIEW part and the SEND part may be determined such that the part same as the display part on the sub-console 1200 is made more proximate to the display part on the sub-console 1200 in the front-to-rear direction, compared to the other part.

When it is unnecessary to align the display positions of the VIEW part or the SEND part between the consoles 1100 and 1200, the step SP124 in FIG. 12A may be omitted.

7.5 Modification of Non-Association of Consoles 1100, 1200

In the embodiment described above, the display contents on the left and right displays 52 and 54 on the sub-console 1200 are associated with the display contents on the left and right main displays 82 and 84 on the main console 1100. However, both consoles are not necessarily associated with each other. The main console 1100 and the sub-console 1200 may be configured to be capable of independently selecting the display content. In the embodiment described above, both consoles 1100 and 1200 share the image-data template (see FIG. 10B). However, when the display content on the sub-console 1200 can be set independent of the display content on the main console 1100, the sub-console 1200 may be configured to display the content unique to the sub-console 1200.

Figure 20A:
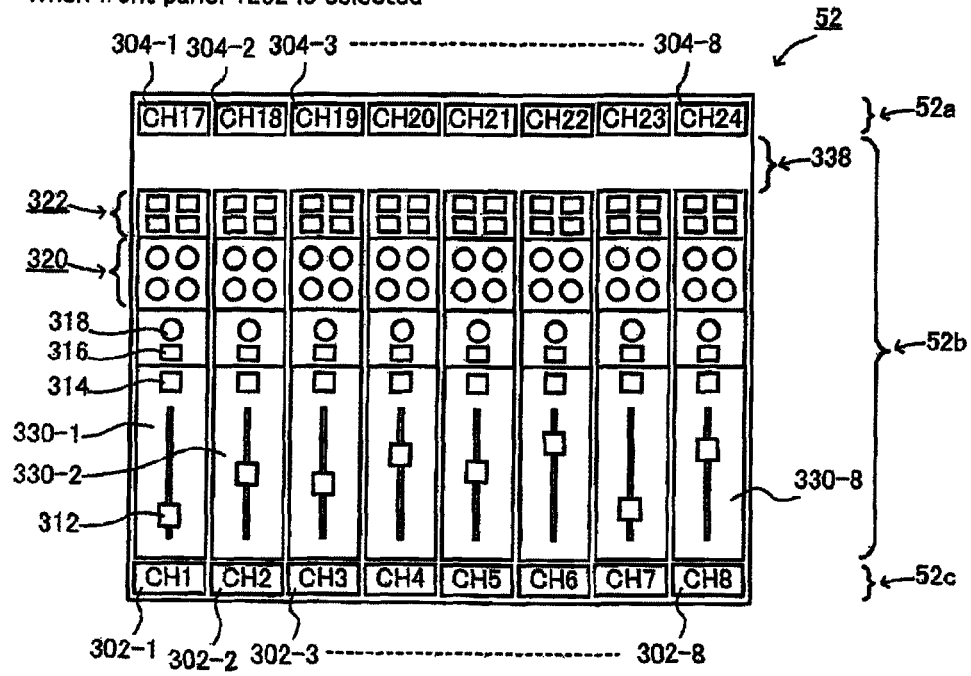
FIG. 20A is a view illustrating a display example on the left display according to another modification.
Figure 20B:
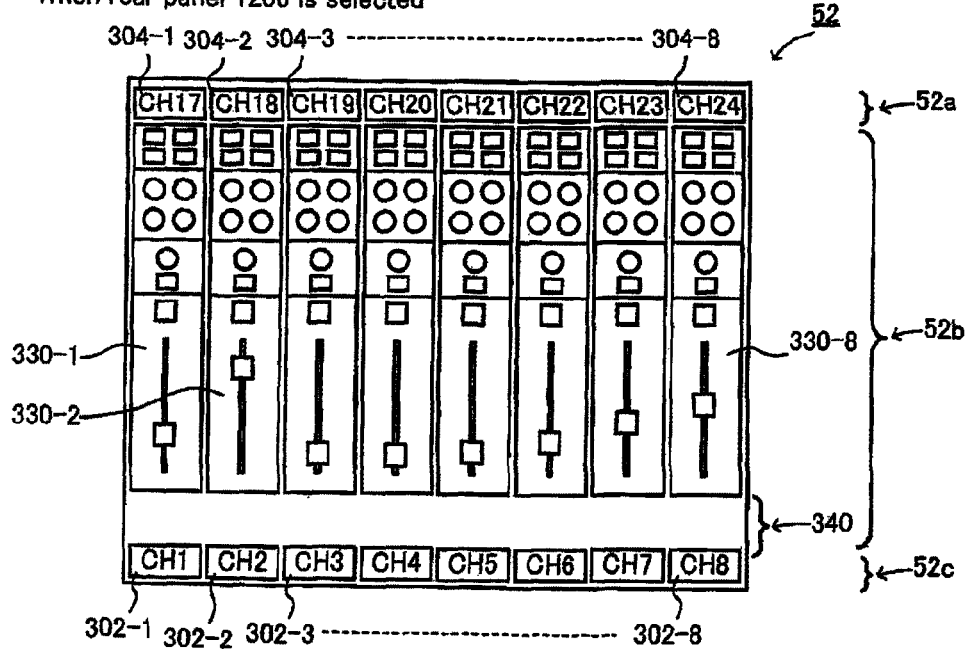
FIG. 20B is a view illustrating a display example on the left display according to another modification.

It is considered as one example that a "pseudo channel strip mode" that simulates the channel strip is set as the display mode displayed on the sub-console 1200. In this mode, images illustrated in FIGS. 20A and 20B are displayed on the left display 52. In FIGS. 20A and 20B, the display contents on the channel icons 302-1 to 302-8 and 304-1 to 304-8 are the same as those in FIG. 8.

In FIG. 20A, "8" pseudo channel strip images 330-1 to 330-8 are displayed on the parameter area 52b. In order to allow these pseudo channel strip images 330-1 to 330-8 to correspond to the lower channel strip group 40, the pseudo channel strip images 330-1 to 330-8 are displayed in intimate contact with the channel icons 302-1 to 302-8 involved with the lower channel strips 40-1 to 40-8, and the non-display section 338 is formed between the pseudo channel strip images 330-1 to 330-8 and the channel icons 304-1 to 304-8. On the other hand, when the pseudo channel strip images 330-1 to 330-8 corresponding to the upper channel strips 42-1 to 42-8 are displayed on the parameter area 52b, the display state thereof is as illustrated in FIG. 20B. In FIG. 20B, in order to allow these pseudo channel strip images 330-1 to 330-8 to correspond to the upper channel strip group 42, the pseudo channel strip images 330-1 to 330-8 are displayed in intimate contact with the channel icons 304-1 to 304-8 involved with the upper channel strips 42-1 to 42-8, and the non-display section 340 is formed between the pseudo channel strip images 330-1 to 330-8 and the channel icons 302-1 to 302-8.

In the pseudo channel strip image 330-1 in FIG. 20A, a fader level display section 312 displays the level of the fader of the channel corresponding to the image like the fader. Button images 314 and 316 and a button image group 322 form "6" button images in total. The signal processing parameter whose "on/off state" is changed in the corresponding channel can optionally be assigned to these button images. When a user depresses any one of the buttons, the depression is detected through the touch panel, whereby the on/off state of the corresponding parameter is changed.

Parameter display sections 318 and 320 display "5" parameters in total, which are optionally assigned, by a diagram of a circular graph. The parameter assigned to the parameter display sections 318 and 320 is the one assuming a continuous "parameter value" in the corresponding channel. When a user depresses the parameter display sections 318 and 320 or the fader level display section 312, this display section becomes the selected state (e.g., highlighted), and the parameter corresponding to the knob 18 located immediately below the pseudo channel strip image 330-1 is assigned thereto. Thus, the user can operate the parameter by operating the knob 18.

The images similar to that described above are displayed for the remaining channels ($9^{th}$ to $16^{th}$, and $25^{th}$ to $32^{nd}$ input channels) on the right display 54. The various changing manners can be employed for the changeover of the states in FIGS. 20A and 20B. For example, the layer selecting sections 44 and 46 (see FIG. 6) can be used. Specifically, if the last-operated one of the layer selecting sections 44 and 46 is the lower layer selecting section 44, the lower channel strip group 40 is selected, so that the screen in FIG. 20A is displayed. On the other hand, if the last-operated one of the layer selecting sections 44 and 46 is the upper layer selecting section 46, the upper channel strip group 42 is selected, so that the screen in FIG. 20B is displayed.

In the present operation mode, the parameters, which can be set by using the actual operation devices on the upper and lower channel strip groups 42 and 40, e.g., the fader level, are also displayed on the left and right displays 52 and 54. The meaning for executing the display described above will be described with reference to FIG. 6. When an operator sitting on a seat takes a suitable posture in order to operate the lower channel strip group 40 on the sub-console 1200 illustrated in FIG. 6, he/she is difficult to reach the upper channel strip group 42. Therefore, the operator has to stand up in order to operate the upper channel strip group 42. When the function of the upper channel strip group 42 can be substituted for the knob 18 on the front panel 1202 and the left and right displays 52 and 54 as described above, the operator can adjust the parameters involved with the upper channel strip group 42 in his/her seat.

When the operator attempts to simultaneously operate the electric fader 2 on the lower channel strip 40-1 and the electric fader 2 on the upper channel strips 42-1 to 42-16 in order to adjust the sound volume balance, he/she has some troubles in operating the electric faders 2, since both electric faders 2 are separated from each other. In this case, if one of the electric faders 2 and the knob 18 are operated by using the present operation mode, two operation devices to be operated can be made close to each other.

Other Modifications (1) In the embodiment described above, one or plural sub-consoles 1200 are connected to the main console 1100. However, the sub-console 1200 may be connected to the IP network 1000, so that the main console 1100 and the sub-console 1200 may be communicated through the IP network 1000. In this structure, the sub-console 1200 can easily be installed at the place apart from the main console 1100.

(2) The channel strip groups 40 and 42 in the embodiment described above are the same in that both groups 40 and 42 are provided with the electric fader 2, the CUE button 6, the f button 8, the SEL button 10, and the on/off button 12. However, the channel strips are not limited to those in the embodiment described above, and various modifications are possible. For example, a mere fader (the one that can be moved along a track on a straight line, and that increases or decreases the level of the sound signal of the corresponding channel) that cannot be automatically driven may be employed instead of the electric fader 2, and the components 6, 8, 10, and 12 other than the fader may be eliminated.

(3) The parameter areas 52b and 54b on the sub-console 1200 display the parameter of one of the upper and lower channel strip groups 42 and 40. However, when the parameters can be displayed on the parameter areas 52b and 54b, the parameters of both the upper and lower channel strip groups 42 and 40 may be displayed thereon.

(4) In the embodiment described above, the current data 1150 is stored in the main console 1100 (see FIG. 10), and the sub-console 1200 stores only the parameters 1252 related to the upper and lower layers assigned thereto as the signal processing parameter. However, the sub-console 1200 may be configured to retain the current data equivalent to the current data 1150. In this case, when some signal processing parameters are changed on the consoles 1100 and 1200, the changed content may immediately be reported to the other so as to retain the equivalent content as the current data.

What is claimed is:

1. A mixing control apparatus that sets a parameter value of each sound signal for performing a signal process to a sound signal of a first channel group including plural channels and a sound signal of a second channel group including plural channels, the mixing control apparatus comprising:

a first channel strip group composed of plural channel strips, each having a first operation device for setting a parameter value of the sound signal belonging to the first channel group;

a second channel strip group that is provided at the rear of the first channel strip group and above the first channel strip group, as viewed from the front, and that is composed of plural channel strips, each having a second operation device for setting a parameter value of the sound signal belonging to the second channel group; and a display section that is provided between the first channel strip group and the second channel strip group, and that displays the parameter value involved with at least designated one of the first channel group or the second channel group, wherein the channel strips belonging to the first channel strip group are arranged along a lateral direction of the mixing control apparatus, as viewed from the front, and each of the channel strips has a same predetermined width, wherein the channel strips belonging to the second channel strip group are arranged along the lateral direction of the mixing control apparatus, as viewed from the front, and each of the channel strips has a same predetermined width equal to the width of each channel strip belonging to the first channel strip group, wherein the display section has a screen divided into plural frames, each being arranged along the lateral direction of the mixing control apparatus, as viewed from the front, and each having a same predetermined width equal to the width of each channel strip belonging to the first and second channel strip groups, and wherein one channel strip from the left belonging to the first channel strip group, one channel strip from the left belonging to the second channel strip group, and one frame from the left of the display section among the plural frames are arranged on the same position in the lateral direction of the mixing control apparatus as viewed from the front.

2. The mixing control apparatus according to claim 1, wherein the first channel strip group and the second channel groups have equal number of channels.

3. A mixing control apparatus that sets a parameter value of each sound signal for performing a signal process to a sound signal of a first channel group including plural channels and a sound signal of a second channel group including plural channels, the mixing control apparatus comprising:

a first channel strip group composed of plural channel strips, each having a first operation device for setting a parameter value of the sound signal belonging to the first channel group;

a second channel strip group that is provided at the rear of the first channel strip group and above the first channel strip group, as viewed from the front, and that is composed of plural channel strips, each having a second operation device for setting a parameter value of the sound signal belonging to the second channel group; and a display section that is provided between the first channel strip group and the second channel strip group, and that displays the parameter value involved with at least designated one of the first channel group or the second channel group, wherein the first channel strip group has a tilt angle $\theta 1$ relative a resting surface, the display section has a tilt angle $\theta 2$ relative to the resting surface, and the second channel strip group has a tilt angle $\theta 3$ relative to the resting surface, where $\theta 1 < \theta 3 < \theta 2$.

* * * * *